(12) United States Patent
Hirai et al.

(10) Patent No.: US 11,668,966 B2
(45) Date of Patent: Jun. 6, 2023

(54) LIQUID CRYSTAL DISPLAY DEVICE

(71) Applicant: Sharp Kabushiki Kaisha, Sakai (JP)

(72) Inventors: Akira Hirai, Sakai (JP); Yuichi Kawahira, Sakai (JP); Akira Sakai, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/747,030

(22) Filed: May 18, 2022

(65) Prior Publication Data
US 2022/0373836 A1 Nov. 24, 2022

(30) Foreign Application Priority Data
May 20, 2021 (JP) .............................. JP2021-085359

(51) Int. Cl.
| | |
|---|---|
| *G02F 1/1368* | (2006.01) |
| *G02F 1/1333* | (2006.01) |
| *G02F 1/1362* | (2006.01) |
| *G02F 1/1343* | (2006.01) |
| *G02F 1/13363* | (2006.01) |
| *G02F 1/1335* | (2006.01) |
| *G06F 3/044* | (2006.01) |
| *G06F 3/041* | (2006.01) |

(52) U.S. Cl.
CPC ...... *G02F 1/133308* (2013.01); *G02F 1/1368* (2013.01); *G02F 1/13338* (2013.01); *G02F 1/13363* (2013.01); *G02F 1/133531* (2021.01); *G02F 1/134309* (2013.01); *G02F 1/136286* (2013.01); *G02F 1/133345* (2013.01); *G02F 1/133514* (2013.01); *G06F 3/044* (2013.01); *G06F 3/0412* (2013.01); *G06F 3/04164* (2019.05)

(58) Field of Classification Search
CPC .......... G02F 1/133308; G02F 1/13338; G02F 1/133531; G02F 1/13363; G02F 1/134309; G02F 1/136286; G02F 1/1368; G02F 1/133345; G06F 3/0412; G06F 3/04164; G06F 3/044
See application file for complete search history.

(56) References Cited

U.S. PATENT DOCUMENTS

| | | | |
|---|---|---|---|
| 2013/0128192 A1 | 5/2013 | Ishikawa et al. | |
| 2015/0177548 A1* | 6/2015 | Jeon | ........ G02F 1/133308 349/12 |

FOREIGN PATENT DOCUMENTS

WO 2012/017617 A1 2/2012

\* cited by examiner

*Primary Examiner* — James A Dudek
(74) *Attorney, Agent, or Firm* — Keating & Bennett, LLP

(57) ABSTRACT

The liquid crystal display device includes: a display region for displaying an image; and a frame region surrounding the display region, the liquid crystal display device sequentially including from a viewing surface side toward a back surface side: a first polarizing plate; a first substrate provided with a switching element connected to a gate line and a source line; a liquid crystal layer; a second substrate; and a second polarizing plate, in the frame region, the first substrate sequentially including from a viewing surface side toward a back surface side a support substrate, a reflectance-reducing layer, and a metal line layer that overlaps the reflectance-reducing layer and includes at least one of a gate line layer provided with the gate line or a source line layer provided with the source line, the reflectance-reducing layer having a lower viewing surface side reflectance than the metal line layer.

27 Claims, 23 Drawing Sheets

Vertical direction of screen

Horizontal direction of screen

Vertical direction of screen

Horizontal direction of screen

Vertical direction of screen

Horizontal direction of screen

LIQUID CRYSTAL DISPLAY DEVICE

CROSS-REFERENCE TO RELATED APPLICATIONS

The present application claims priority under 35 U.S.C. § 119 to Japanese Patent Application No. 2021-085359 filed on May 20, 2021, the contents of which are incorporated herein by reference in their entirety.

BACKGROUND OF THE INVENTION

Field of the Invention

The following disclosure relates to liquid crystal display devices.

Description of Related Art

Liquid crystal display devices are display devices utilizing a liquid crystal composition to display images. In a typical display mode thereof, voltage is applied to a liquid crystal layer such that the alignment of liquid crystal molecules in the liquid crystal layer is changed according to the applied voltage, whereby the amount of light transmitted is controlled. Such liquid crystal display devices have advantageous features such as thin profile, light weight, and low power consumption, and are therefore used in a variety of fields.

For example, a liquid crystal display device includes cover glass (CG), a first polarizing plate, a thin-film transistor (TFT) substrate provided with TFTs, a liquid crystal layer, a color filter (CF) substrate provided with CFs, a second polarizing plate, and CG.

As a technique relating to liquid crystal display devices, WO 2012/017617 discloses a liquid crystal display device including: a first substrate and a second substrate disposed to face each other; a sealing component provided in a seal region that is a region continuously formed in a ring shape along a frame region that surrounds a display region, the sealing component bonding the first substrate and the second substrate to each other; a liquid crystal layer provided in a region enclosed by the sealing component between the first substrate and the second substrate; a first polarizing plate disposed on the first substrate on a side opposite to the liquid crystal layer; a second polarizing plate disposed on the second substrate on a side opposite to the liquid crystal layer; and a frame light-shielding layer disposed, at least between the first substrate and the first polarizing plate, in a region within the frame region that overlaps at least a part of the seal region, the frame light-shielding layer defining a frame light-shielding region.

BRIEF SUMMARY OF THE INVENTION

Liquid crystal display devices, especially liquid crystal display devices for mobile devices, are preferred to be thin, light weight, and inexpensive. Thus, these demands have been tried to be achieved by removing cover glass, which is a technique called a CG-less (cover glass-less) mode.

Also, a narrow frame has been desired in terms of designability. A liquid crystal display device typically includes a CF substrate on the viewing surface side. Meanwhile, an inverted structure in which a TFT substrate being larger than a CF substrate is disposed on the viewer side can achieve a narrow frame.

The inverted structure unfortunately deteriorates the appearance of, in particular, the frame region because of a line metal disposed on the TFT substrate. Specifically, the line metal deteriorates the appearance because it has a high reflectance and reflects external light.

In response to such an issue, suggested is a method including printing a design on the frame region to reduce the reflection of external light. A specific method is one including providing a black ink between a polarizing plate and CG of a liquid crystal display device. Meanwhile, liquid crystal display devices for mobile use have been desired to be in a CG-less mode.

The present invention has been made under the current situation in the art and aims to provide a liquid crystal display device capable of reducing the number of components, having a narrow frame, and reducing or preventing deterioration of the appearance of a frame region.

(1) One embodiment of the present invention is directed to a liquid crystal display device including: a display region for displaying an image; and a frame region surrounding the display region, the liquid crystal display device sequentially including from a viewing surface side toward a back surface side: a first polarizing plate; a first substrate provided with a switching element connected to a gate line and a source line; a liquid crystal layer; a second substrate; and a second polarizing plate, in the frame region, the first substrate sequentially including from a viewing surface side toward a back surface side a support substrate, a reflectance-reducing layer, and a metal line layer that overlaps the reflectance-reducing layer and includes at least one of a gate line layer provided with the gate line or a source line layer provided with the source line, the reflectance-reducing layer having a lower viewing surface side reflectance than the metal line layer.

(2) In an embodiment of the present invention, the liquid crystal display device includes the structure (1), and the metal line layer includes the gate line layer or the source line layer whichever is closer to the viewing surface.

(3) In an embodiment of the present invention, the liquid crystal display device includes the structure (1) or (2), and the first polarizing plate is not provided with cover glass on a viewing surface side thereof.

(4) In an embodiment of the present invention, the liquid crystal display device includes the structure (1), (2), or (3), the first substrate includes a terminal side for disposing a terminal, and the first polarizing plate extends to an end of the terminal side.

(5) In an embodiment of the present invention, the liquid crystal display device includes the structure (1), (2), (3), or (4), and the reflectance-reducing layer includes at least one of an organic film or an inorganic film.

(6) In an embodiment of the present invention, the liquid crystal display device includes the structure (5), and the organic film contains carbon black.

(7) In an embodiment of the present invention, the liquid crystal display device includes the structure (5), and the organic film is a retardation film.

(8) In an embodiment of the present invention, the liquid crystal display device includes the structure (7), and the retardation film has a slow axis forming an angle of 45° with a transmission axis of the first polarizing plate.

(9) In an embodiment of the present invention, the liquid crystal display device includes the structure (5), and the organic film is a polarizing film.

(10) In an embodiment of the present invention, the liquid crystal display device includes the structure (9), and the polarizing film has a transmission axis forming an angle of 90° with a transmission axis of the first polarizing plate.

(11) In an embodiment of the present invention, the liquid crystal display device includes the structure (5), (6), (7), (8), (9), or (10), and the inorganic film contains an alloy.

(12) In an embodiment of the present invention, the liquid crystal display device includes the structure (5), (6), (7), (8), (9), or (10), and the inorganic film contains an oxide or a nitride.

(13) In an embodiment of the present invention, the liquid crystal display device includes the structure (5), (6), (7), (8), (9), (10), (11), or (12), and the inorganic film is in contact with the metal line layer.

(14) In an embodiment of the present invention, the liquid crystal display device includes the structure (1), (2), (3), (4), (5), (6), (7), (8), (9), (10), (11), (12), or (13), and the first substrate includes a touch panel-driving line on a back surface side of the support substrate.

(15) In an embodiment of the present invention, the liquid crystal display device includes the structure (1), (2), (3), (4), (5), (6), (7), (8), (9), (10), (11), (12), (13), or (14), and the second substrate includes a color filter layer.

(16) In an embodiment of the present invention, the liquid crystal display device includes the structure (1), (2), (3), (4), (5), (6), (7), (8), (9), (10), (11), (12), (13), (14), or (15), and in the frame region, the first substrate further includes a metal film that overlaps the reflectance-reducing layer and is in contact with a back surface side of the reflectance-reducing layer.

(17) In an embodiment of the present invention, the liquid crystal display device includes the structure (1), (2), (3), (4), (5), (6), (7), (8), (9), (10), (11), (12), (13), (14), (15), or (16), in the frame region, the first substrate further includes a float electrode that overlaps the reflectance-reducing layer and is in contact with a back surface side of the reflectance-reducing layer, in the frame region, the reflectance-reducing layer and the float electrode overlap the source line layer, and the float electrode is a conductive layer that is disposed in the same layer as for the gate line layer and is not connected to the gate line layer.

(18) In an embodiment of the present invention, the liquid crystal display device includes the structure (1), (2), (3), (4), (5), (6), (7), (8), (9), (10), (11), (12), (13), (14), (15), (16), or (17), and in the frame region, the first substrate further includes an insulating layer between the reflectance-reducing layer and the metal line layer.

The present invention can provide a liquid crystal display device capable of reducing the number of components, having a narrow frame, and reducing or preventing deterioration of the appearance of a frame region.

DETAILED DESCRIPTION OF THE INVENTION

Hereinafter, embodiments of the present invention are described in more detail with reference to the drawings. The present invention is not limited to these embodiments.

Definition of Terms

Herein, the term "viewing surface side" means a side closer to the screen (display surface) of the liquid crystal display device, and the term "back surface side" means a side farther from the screen (display surface) of the liquid crystal display device.

Embodiment

Figure 1:
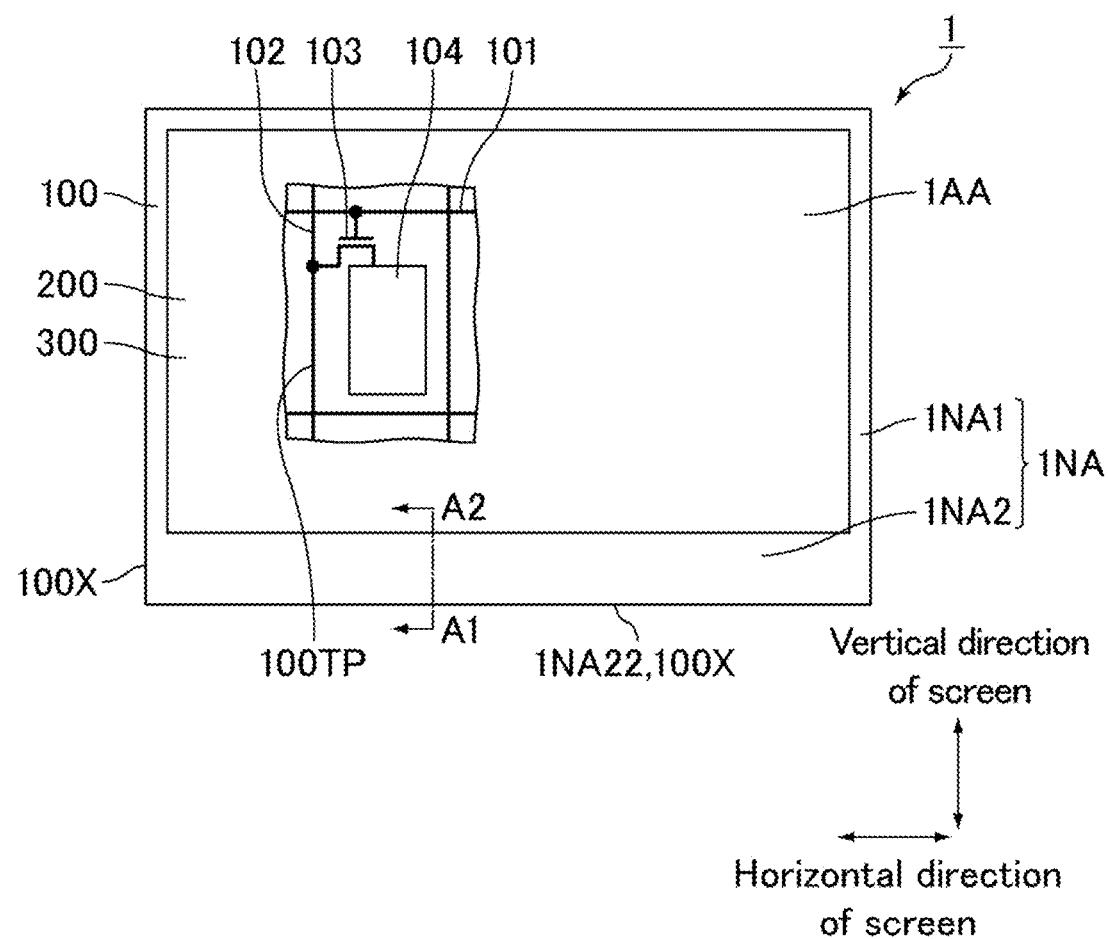
FIG. 1 is a schematic plan view of a liquid crystal display device of an embodiment.
Figure 2:
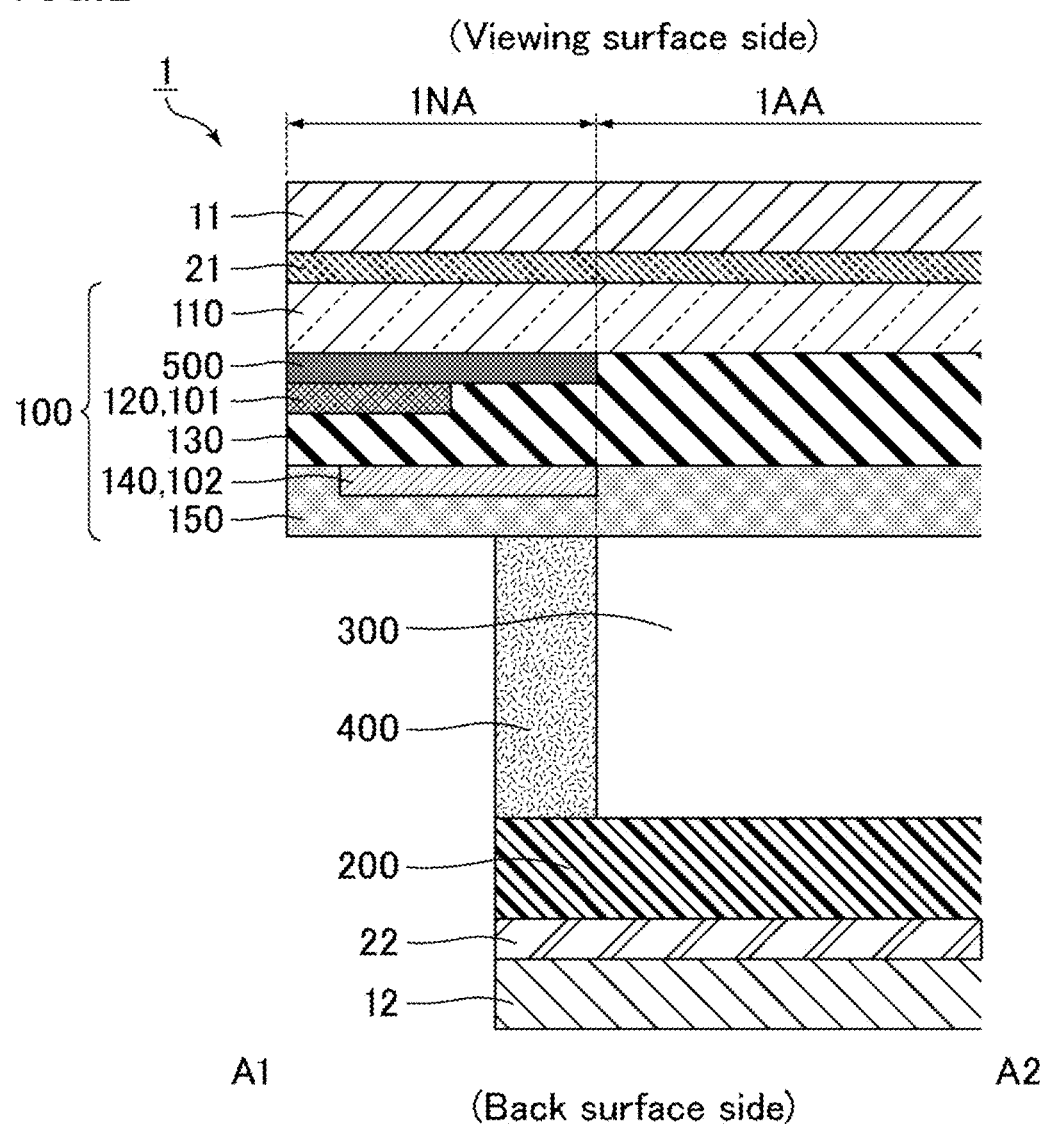
FIG. 2 is a schematic cross-sectional view taken along line A1-A2 in FIG. 1.

FIG. 1 is a schematic plan view of a liquid crystal display device of an embodiment. FIG. 2 is a schematic cross-sectional view taken along line A1-A2 in FIG. 1.

As shown in FIG. 1, a liquid crystal display device 1 of the present embodiment includes a display region 1AA for displaying an image and a frame region 1NA surrounding the display region 1AA. Also, as shown in FIG. 1 and FIG. 2, the liquid crystal display device 1 sequentially includes from the viewing surface side toward the back surface side a first polarizing plate 11, a first adhesive layer 21, a thin-film transistor (TFT) substrate 100 including TFTs 103 as switching elements each connected to a gate line 101 and a source line 102, a liquid crystal layer 300, a color filter (CF) substrate 200 including CFs, a second adhesive layer 22, and a second polarizing plate 12. The TFT substrate 100 and the CF substrate 200 are attached to each other with a sealing material 400 in the frame region 1NA and with a gap corresponding to the thickness of the liquid crystal layer 300 therebetween.

In the frame region 1NA, the TFT substrate 100 sequentially includes from the viewing surface side toward the back surface side a support substrate 110, a reflectance-reducing layer 500, a gate line layer 120, a gate insulator 130, a source line layer 140, and an interlayer insulator 150.

The liquid crystal display device 1 sequentially includes from the viewing surface side toward the back surface side the TFT substrate 100 as the first substrate and the CF substrate 200 as the second substrate. Such an inverted structure in which the TFT substrate 100 being larger than the CF substrate 200 is disposed closer to the viewing surface can achieve a structure in which the first polarizing plate 11 extends to an end (substrate end) 1NA22 of a terminal side 1NA2 of the TFT substrate 100. Specifically, a flat (full-flat) design can be achieved in which the polarizing plate extends to an overall substrate end 100X, including the end 1NA22 of the terminal side 1NA2, to achieve a structure without a frame bezel (frame). This structure resultantly achieves a narrow frame.

In WO 2012/017617, a light-shielding layer is disposed between a substrate and a polarizing plate in order to shield the frame region of the liquid crystal display device from light. The following describes a liquid crystal display device of a comparative embodiment in which a light-shielding ink is printed on a CG-less liquid crystal display device.

Figure 34:
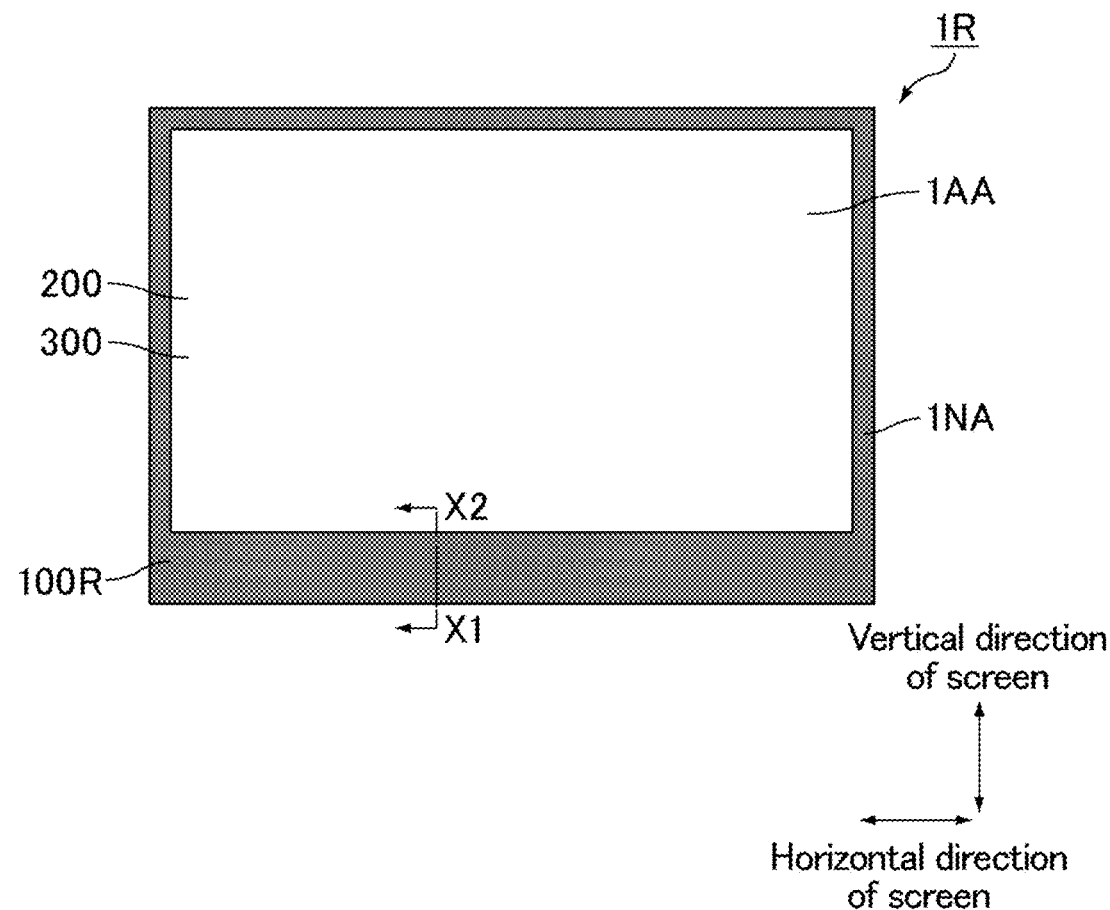
FIG. 34 is a schematic plan view of a liquid crystal display device of a comparative embodiment.
Figure 35:
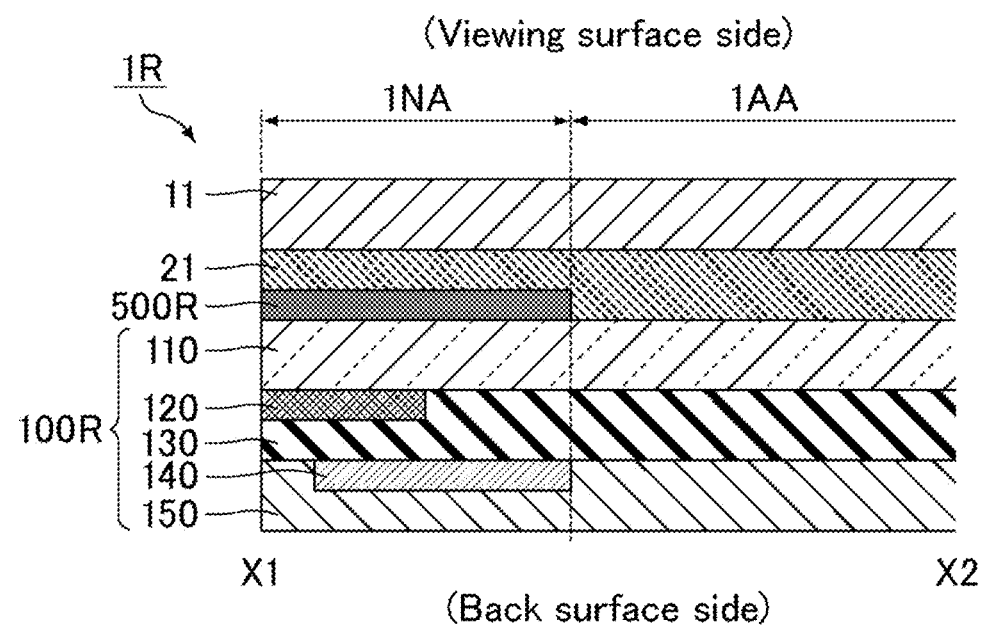
FIG. 35 is a schematic cross-sectional view taken along line X1-X2 in FIG. 34.

FIG. 34 is a schematic plan view of a liquid crystal display device of a comparative embodiment. FIG. 35 is a schematic cross-sectional view taken along line X1-X2 in FIG. 34.

As shown in FIG. 34, a liquid crystal display device 1R of the comparative embodiment includes the display region 1AA for displaying an image and the frame region 1NA surrounding the display region 1AA. Also, as shown in FIG. 34 and FIG. 35, the liquid crystal display device 1R sequentially includes from the viewing surface side toward the back surface side the first polarizing plate 11, the first adhesive layer 21, a TFT substrate 100R, the liquid crystal layer 300, the CF substrate 200, and a second polarizing plate. The TFT substrate 100R also sequentially includes from the viewing surface side toward the back surface side the support substrate 110, the gate line layer 120, the gate insulator 130, the source line layer 140, and the interlayer insulator 150.

As shown in FIG. 35, the liquid crystal display device 1R of the comparative embodiment includes a print ink 500R between the first adhesive layer 21 and the TFT substrate 100R in the frame region 1NA. This structure can achieve a CG-less mode and reduce or prevent deterioration of the appearance of the frame region 1NA due to reflection of external light. However, the appearance of the frame region 1NA is deteriorated by unevenness caused by the print ink 500R.

Meanwhile, in the frame region 1NA, the TFT substrate 100 of the present embodiment sequentially includes from the viewing surface side toward the back surface side the support substrate 110, the reflectance-reducing layer 500, and the gate line layer 120 and the source line layer 140 as the metal line layers overlapping the reflectance-reducing layer 500, and the reflectance-reducing layer 500 has a lower viewing surface side reflectance than the gate line layer 120 and the source line layer 140. This structure can reduce reflection of external light by the gate line layer 120 and the source line layer 140 in the frame region 1NA to reduce or prevent deterioration of the appearance of the frame region 1NA. Also, this structure can eliminate the need for disposing a light-shielding layer between a substrate and a polarizing plate, which is performed in WO 2012/017617, in a cover glass-less display device, and thus can prevent unevenness between the frame region 1NA and the display region 1AA. Accordingly, this structure can reduce or prevent deterioration of the appearance of the frame region 1NA due to such unevenness while reducing the number of components.

As described, in the present embodiment, the reflectance-reducing layer 500 is disposed in the cell (on the side closer to the liquid crystal layer 300 of the support substrate 110 included in the TFT substrate 100). The present embodiment thus can eliminate the need for disposing a light-shielding layer between a substrate and a polarizing plate (out of the cell), which is performed in WO 2012/017617, in a cover glass-less liquid crystal display device 1 intended to achieve thin profile, light weight, and inexpensiveness, and thereby can prevent unevenness between the frame region 1NA and the display region 1AA. As a result, the liquid crystal display device 1 has a better appearance of the frame region 1NA, has no need for providing a margin in case of positional displacement in disposing an out-cell light-shielding layer, and thus achieves a narrower frame.

The following specifically describes the liquid crystal display device of the present embodiment.

As shown in FIG. 1, the liquid crystal display device 1 of the present embodiment displays an image using a liquid crystal composition. The liquid crystal display device 1 as a whole has a horizontally long square (rectangular) shape whose long-side direction corresponds to an X-axis direction and whose short side direction corresponds to a Y-axis direction. The X-axis direction indicates the horizontal direction of the screen and the Y-axis direction indicates the vertical direction of the screen.

The liquid crystal display device 1 is sectioned into the display region (active area) 1AA capable of displaying an image and the frame region (non-active area) 1NA surrounding the display region 1AA and incapable of displaying an image. In the liquid crystal display device 1, the display region 1AA is located closer to one end (upper side in FIG. 1) in the short-side direction. The frame region 1NA includes a substantially frame-shaped region 1NA1 surrounding the display region 1AA and the terminal side 1NA2 for disposing terminals on the other end (lower side in FIG. 1) in the short-side direction. The substantially frame-shaped region 1NA1 corresponds to a frame region provided with a frame-shaped sealing material, and the terminal side 1NA2 corresponds to an exposed portion of the later-described TFT substrate 100 which does not overlap the CF substrate 200.

The liquid crystal display device 1 sequentially includes from the viewing surface side toward the back surface side the TFT substrate 100, the liquid crystal layer 300 containing a liquid crystal material, and the CF substrate 200, and the TFT substrate 100 and the CF substrate 200 are attached to each other with a sealing material with a gap corresponding to the thickness of the liquid crystal layer 300 therebetween. The TFT substrate 100 and the CF substrate 200 are each obtained by forming a stack of films on a substrate being highly transparent to light by a known method such as photolithography.

The CF substrate 200 includes a support substrate, a CF layer and a black matrix layer formed on the viewing surface side of the support substrate, and a common electrode formed on the viewing surface side of the CF layer and the black matrix layer.

As shown in FIG. 1, the CF substrate 200 has a similar long-side dimension to the TFT substrate 100 but has a smaller short-side dimension than the TFT substrate 100, and is attached to the TFT substrate 100 with one ends (upper sides in FIG. 1) in the short-side direction aligned. Accordingly, as shown in FIG. 1, the other end (lower side in FIG. 1) of the TFT substrate 100 in the short-side direction does not overlap the CF substrate 200 and the front and back surfaces thereof are both exposed in a certain range. This exposed portion serves as the terminal side 1NA2.

As shown in FIG. 1, in the display region 1AA, the TFT substrate 100 includes on the support substrate 110 parallel gate lines 101 extending in the horizontal direction of the screen and parallel source lines 102 extending in the direction intersecting the gate lines 101 (in the vertical direction of the screen) via an insulator. The gate lines 101 and the source lines 102 form a grid pattern as a whole to define respective pixels.

A TFT 103 as a switching element is disposed at each of the intersections of the gate lines 101 and the source lines 102. The TFT substrate 100 includes pixel electrodes 104. Each of the pixel electrodes 104 is disposed in each region surrounded by two adjacent gate lines 101 and two adjacent source lines 102 and is electrically connected to the corresponding source line 102 via a semiconductor layer of the TFT 103. Each pixel electrode 104 is set to have a potential in response to a data signal supplied via the corresponding TFT 103.

The liquid crystal display device 1 includes in the frame region 1NA of the TFT substrate 100 a source driver electrically connected to the source lines 102, a gate driver electrically connected to the gate lines 101, and a controller. The gate driver sequentially supplies each of the gate lines 101 with a scanning signal based on the control by the controller. The source driver supplies each of the source lines 102 with a data signal based on the control by the controller at a timing when voltage is applied to the TFT 103 by the scanning signal.

Each of the pixel electrodes 104 is set to have a potential in response to a data signal supplied via the corresponding TFT 103. Then, an electric field is generated between the pixel electrode 104 and the common electrode to control the alignment of liquid crystal molecules in the liquid crystal layer 300. The liquid crystal display device 1 changes the alignment state of the liquid crystal molecules according to the magnitude of the voltage applied to the liquid crystal layer 300 in each pixel and thereby adjusts the transmittance of light in the liquid crystal layer 300 to display an image.

The support substrate for each of the support substrate 110 and the CF substrate 200 is preferably a transparent substrate, and examples thereof include a glass substrate and a plastic substrate.

In the frame region 1NA, the reflectance-reducing layer 500 overlaps the metal line layer between the support substrate 110 and the metal line layer. The reflectance-reducing layer 500 may be entirely or partially disposed in the frame region 1NA. The reflectance-reducing layer 500 may be disposed in the display region 1AA in addition to the frame region 1NA.

The reflectance-reducing layer 500 has a lower viewing surface side reflectance than the metal line layer. The reflectance of each of the reflectance-reducing layer 500 and the metal line layer can be measured by, for example, forming a layer to be measured on a glass substrate, allowing light to be incident on the target layer from the glass substrate side with a D65 light source, and measuring the reflectance of the layer with CM-2600d available from Konica Minolta, Inc. The measurement wavelength ranges from 380 nm to 780 nm which corresponds to a visible light region, and the measurement is performed without components such as a polarizing plate.

The reflectance-reducing layer 500 has a lower viewing surface side reflectance than the metal line layer by preferably 5% or more, more preferably by 10% or more, still more preferably by 20% or more. This structure can further reduce reflection of external light due to the metal line layer.

The reflectance-reducing layer 500 has a viewing surface side reflectance of 3% or more and 30% or less, for example. The metal line layer has a viewing surface side reflectance of 35% or more and 85% or less, for example.

The reflectance-reducing layer 500 has a transmittance of preferably 95% or less, more preferably 50% or less, still more preferably 10% or less. Such a reflectance-reducing layer 500 can further reduce viewing surface side reflection of the reflectance-reducing layer 500 to effectively reduce reflection of external light. The transmittance of the reflectance-reducing layer 500 can be measured by, for example, forming a reflectance-reducing layer to be measured on a glass substrate and measuring the transmittance of the layer with V7100 available from Jasco Corporation using a D65 light source. The measurement wavelength ranges from 380 nm to 780 nm which corresponds to a visible light region, and the measurement is performed without components such as a polarizing plate.

The reflectance-reducing layer 500 includes at least one of an organic film or an inorganic film. The organic film and the inorganic film may each be a single-layer film or a multi-layer film.

The organic film for the reflectance-reducing layer 500 preferably contains carbon black. The reflectance-reducing layer 500 with this structure can further reduce reflection of external light. The organic film may be made of a carbon black-containing resin, for example.

The organic film for the reflectance-reducing layer 500 is also preferably a retardation film. The reflectance-reducing layer 500 with this structure converts external light polarized by the first polarizing plate 11 into circularly polarized light and thereby can reduce reflection of external light.

The retardation film has a function of providing a retardation between two perpendicular polarization components using a material such as a birefringent material to change the state of incident polarized light. The retardation film means a retardation film that provides an in-plane retardation of 10 nm or more to at least light having a wavelength of 550 nm. Light having a wavelength of 550 nm is light of a wavelength at which a human has the highest visual sensitivity.

The in-plane retardation is defined as $Re=(ns-nf)\times d$. Here, ns represents the in-plane principal refractive index nx or ny of the retardation film, whichever is greater, and nf represents the in-plane principal refractive index nx or ny of the retardation film, whichever is smaller. The principal refractive index means a value relative to light having a wavelength of 550 nm, unless otherwise specified. The in-plane slow axis (also simply referred to as slow axis) of a retardation film means an axis extending in the direction corresponding to ns, and the in-plane fast axis (also simply referred to as fast axis) thereof means an axis extending in the direction corresponding to nf. The symbol d represents the thickness of the retardation film. Herein, the "retardation" means in-plane retardation, unless otherwise specified.

The retardation film has an in-plane retardation of preferably 107.5 nm or more and 167.5 nm or less, more preferably 117.5 nm or more and 157.5 nm or less, still more preferably 127.5 nm or more and 147.5 nm or less, particularly preferably 137.5 nm. This structure prevents elliptically polarized light and thus can further reduce reflection of external light.

The retardation film may be a layer formed using a photoreactive group-containing liquid crystal polymer (hereinafter, also simply referred to as a "liquid crystal polymer"). Alternatively, the retardation film may be a layer obtained by aligning a liquid crystal polymer on an alignment film usable for a retardation film.

Examples of the liquid crystal polymer include polymers each containing a side chain(s) with a structure including both of a mesogen group, which is often used as a mesogen component of a liquid crystal polymer, such as a biphenyl group, a terphenyl group, a naphthalene group, a phenyl benzoate group, an azobenzene group, or a derivative thereof, and a photoreactive group such as a cinnamoyl group, a chalcone group, a cinnamylidene group, a β-(2-phenyl)acryloyl group, a cinnamic acid group, or a derivative thereof, and a main chain with a structure such as acrylate, methacrylate, maleimide, N-phenyl maleimide, or siloxane.

The retardation film preferably has a slow axis forming an angle of 45° with the transmission axis of the first polarizing plate 11. This structure prevents elliptically polarized light and thus can further reduce reflection of external light.

The organic film for the reflectance-reducing layer 500 is also preferably a polarizing film. The reflectance-reducing layer 500 with this structure can absorb external light polarized by the first polarizing plate 11 and thereby can reduce reflection of external light.

The polarizing film polarizes light. An example of the polarizing film is a film to which an aligned dye with absorption anisotropy is applied. An example of the dye with absorption anisotropy is a dichroic dye.

Examples of the film to which an aligned dye with absorption anisotropy is applied include a film obtained by application of a composition containing a liquid crystal dichroic dye and a film obtained by application of a composition containing a dichroic dye and a polymerizable liquid crystal compound. In order to obtain a rigid film, preferred is a film obtained by application of a composition containing a dichroic dye and a polymerizable liquid crystal compound and formation of a polymer of the polymerizable liquid crystal compound which has been aligned. In order to obtain high polarization capability, more preferred is a film obtained by using a polymerizable liquid crystal compound containing a smectic liquid crystal phase and forming a polymer in the state of a smectic liquid crystal phase.

Preferably, the polarizing film has a transmission axis forming an angle of 90° with the transmission axis of the first polarizing plate 11. This structure allows the polarizing film and the first polarizing plate 11 to be arranged in the crossed Nicols to achieve a favorable black display state.

The inorganic film for the reflectance-reducing layer 500 preferably contains an alloy. This structure can achieve an effect of reducing the reflectance even when the inorganic film is thinner than the organic film. Specific examples of the alloy include an alloy containing CuMo, an alloy containing CuIn, and an alloy containing TiIn.

Also, the inorganic film for the reflectance-reducing layer 500 is preferably a film containing an oxide or a nitride. This structure can reduce the influence on the electrical characteristics of the metal line layer (line metal). A specific example of the oxide is $SiO_2$, and specific examples of the nitride include SiNx, TiN, and MoN.

The reflectance-reducing layer 500 may or may not be in contact with the viewing surface side of the gate line layer 120. When the reflectance-reducing layer 500 is an inorganic film, the reflectance-reducing layer 500 is preferably in contact with the viewing surface side of the gate line layer 120. This structure can cause optical interference between the reflectance-reducing layer 500 and the gate line layer 120, can further reduce reflection of external light, and can further reduce or prevent deterioration of the appearance of the frame region 1NA.

The gate line layer 120 is a line layer for disposing the gate lines 101 and is disposed on the back surface side of the reflectance-reducing layer 500. The source line layer 140 is a line layer for disposing the source lines 102 and is disposed on the back surface side of the gate insulator 130.

For example, the gate line layer 120 and the source line layer 140 are each a single layer of a metal such as copper, titanium, aluminum, molybdenum, or tungsten or an alloy of any of these, or a multilayer of any of these. Each of the lines and electrodes forming the gate lines 101, the source lines 102, and the TFTs 103 can be formed by forming a single layer of a metal such as copper, titanium, aluminum, molybdenum, or tungsten or an alloy of any of these or a multilayer film of any of these by a method such as sputtering, and then patterning the film by a method such as photolithography. Lines and electrodes to be formed in the same layer may contain the same material for efficient production.

Preferably, the metal line layer includes the gate line layer 120 or the source line layer 140 whichever is closer to a viewing surface. This structure can further effectively reduce reflection of external light in the frame region 1NA and further effectively reduce deterioration of the appearance of the frame region 1NA.

The gate insulator 130 is an inorganic insulator, for example. Examples of the inorganic insulator include an inorganic film of silicon nitride (SiNx) or silicon oxide (SiO$_2$) (relative permittivity ε=5 to 7) or a multilayer film of such inorganic insulators.

The interlayer insulator 150 is an inorganic insulator, for example. Examples of the inorganic insulator include an inorganic film of silicon nitride (SiNx) or silicon oxide (SiO$_2$) (relative permittivity ε=5 to 7) or a multilayer film of such inorganic insulators.

The TFT substrate 100 includes touch panel-driving lines 100TP on the back surface side of the support substrate 110. This structure can provide a touch panel function while reducing the thickness of the liquid crystal display device. The touch panel-driving lines 100TP overlap the source lines 102 via an insulating layer in the display region 1AA, for example.

The liquid crystal display device 1 includes a self-capacitance in-cell touch panel, and the display region 1AA is provided with touch panel electrodes and the touch panel-driving lines 100TP. The touch panel electrodes are arranged in a tile-pavement (matrix) pattern. Each of the touch panel-driving lines 100TP is connected to one of the touch panel electrodes. The touch panel-driving lines 100TP are connected to the source driver.

Each of the touch panel electrodes is a division of the later-described common electrode, and functions as a common electrode and is set to have a reference pixel potential (common voltage) during a writing period in which a display signal, which is a signal for display, is written in each pixel. Meanwhile, each of the touch panel electrodes functions as a touch panel electrode during a sensing period in which no display signal is written (no gate scanning is executed). Each of the touch panel electrodes is connected to a touch panel-driving line 100TP, and a signal for sensing is input from the source driver to the touch panel electrode via the corresponding touch panel-driving line 100TP during the sensing period. An example of the signal for sensing is a touch signal which is a pulse signal applied for detecting the change in capacitance of each touch panel electrode.

The CF layer in the CF substrate 200 includes red color filters, green color filters, and blue color filters, and each pixel includes three sub-pixels consisting of a sub-pixel provided with a red color filter, a sub-pixel provided with a green color filter, and a sub-pixel provided with a blue color filter arranged in a striped pattern. Each pixel provides a desired color by controlling the amount of light transmitting the red color filter, the green color filter, and the blue color filter and mixing the colors.

The black matrix layer in the CF substrate 200 is a light-shielding component formed in a grid pattern and partitions the color filters of the respective colors in the color filter layer.

The common electrode is almost entirely formed beyond the boundaries of the pixels. The common electrode is supplied with a constant common signal, whereby the common electrode is maintained to have a constant potential. In the present embodiment, the common electrode is disposed in the CF substrate 200. Alternatively, the common electrode may be disposed in the TFT substrate 100. When being disposed in the TFT substrate 100, the common electrode may be disposed in the same layer as the pixel electrodes 104 or may be disposed on the viewing surface side or the back surface side of the pixel electrodes 104 via an insulator.

Examples of the material for the pixel electrodes 104 and the common electrode include indium tin oxide (ITO) and indium zinc oxide (IZO).

The liquid crystal layer 300 contains a liquid crystal material. Voltage is applied to the liquid crystal layer 300, and the alignment state of the liquid crystal molecules in the liquid crystal material is controlled according to the applied voltage, whereby the amount of light transmitted is controlled. The anisotropy of dielectric constant (Δε) of the liquid crystal molecules defined by the following formula L may be positive or negative. Liquid crystal molecules having a positive anisotropy of dielectric constant are also referred to as positive liquid crystals, while liquid crystal molecules having a negative anisotropy of dielectric constant are also referred to as negative liquid crystals. The direction of the major axes of the liquid crystal molecules corresponds to the direction of the slow axis. Liquid crystal molecules are homogeneously aligned with no voltage applied (in a no-voltage applied state). The direction of the long axis of liquid crystal molecules with no voltage applied is also referred to as an initial alignment direction of liquid crystal molecules.

Δε=(dielectric constant of liquid crystal molecules in long-axis direction)−(dielectric constant of liquid crystal molecules in short-axis direction)　　(Formula L)

An alignment film for controlling the alignment of the liquid crystal molecules in the liquid crystal layer 300 may be disposed between the TFT substrate 100 and the liquid crystal layer 300 and between the CF substrate 200 and the liquid crystal layer 300.

The first polarizing plate 11 and the second polarizing plate 12 are attached to the TFT substrate 100 and the CF substrate 200, respectively, on the surfaces remote from the liquid crystal layer 300. The first polarizing plate 11 and the second polarizing plate 12 are each preferably a linearly polarizing plate.

The liquid crystal display device 1 of the present embodiment is a liquid crystal display device including no retardation film between the TFT substrate 100 and the first polarizing plate 11, and is not of a circular polarization mode but of a linear polarization mode.

Examples of the first polarizing plate 11 and the second polarizing plate 12 include polarizers (absorptive polarizing plates) obtained by dyeing a polyvinyl alcohol (PVA) film with an anisotropic material such as an iodine complex (or a dye) to adsorb the material on the PVA film and stretch-aligning the material. Typically, in order to achieve a mechanical strength and moist heat resistance, each surface of the PVA film is laminated with a protective film such as a triacetyl cellulose (TAC) film for practical use.

Preferably, the absorption axis of the first polarizing plate 11 and the absorption axis of the second polarizing plate 12 are perpendicular to each other. This structure allows the first polarizing plate 11 and the second polarizing plate 12 to be arranged in the crossed Nicols to achieve a favorable black display state with no voltage applied.

Herein, the state where two axes (directions) are "perpendicular to each other" means that they form an angle (absolute value) falling within the range of 90°±3°, more preferably 90°±1°, still more preferably 90°±0.5°, particularly preferably 90° (perfectly perpendicular to each other). Also herein, the state where two axes (directions) are "parallel to each other" means that they form an angle (absolute value) falling within the range of 0°±3°, preferably 0°±1°, more preferably 0°±0.5°, particularly preferably 0° (perfectly parallel to each other).

The liquid crystal display device 1 of the present embodiment includes, in addition to the above components, components including: external circuits such as a tape carrier package (TCP) and a printed-circuit board (PCB); and optical films such as a viewing angle widening film and a luminance improving film, and such a component may be incorporated in another component depending on the type of the component. Components other than the components described above are not limited, and those usually used in the field of liquid crystal display devices can be used. Thus, the description thereof is omitted.

Modified Example 1 of Embodiment

Figure 3:
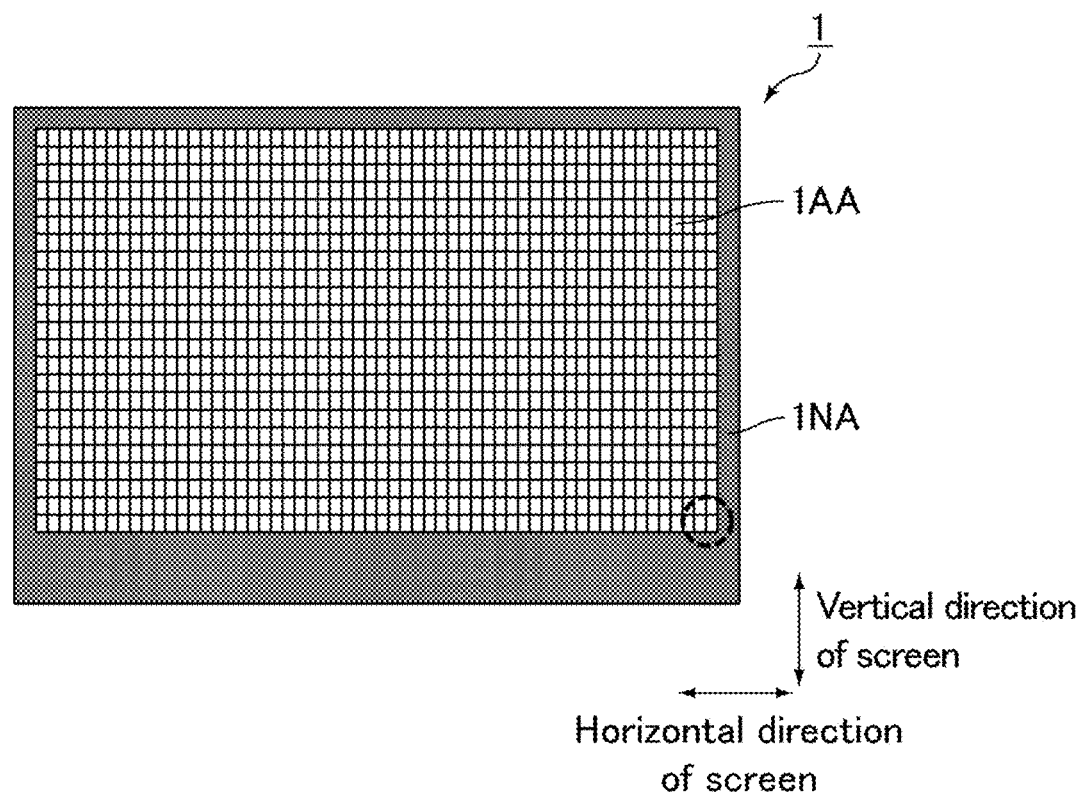
FIG. 3 is a schematic plan view of a liquid crystal display device of Modified Example 1 of the embodiment.
Figure 4:
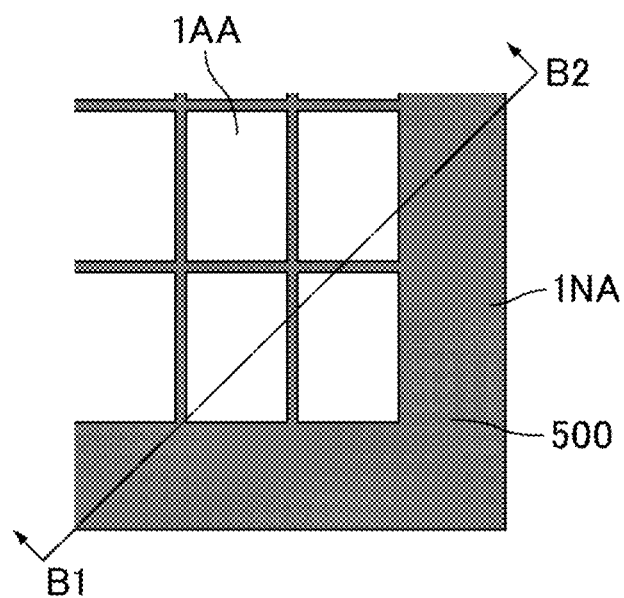
FIG. 4 is a schematic enlarged plan view of the region surrounded by the broken line in FIG. 3, viewed from the viewing surface side.
Figure 5:
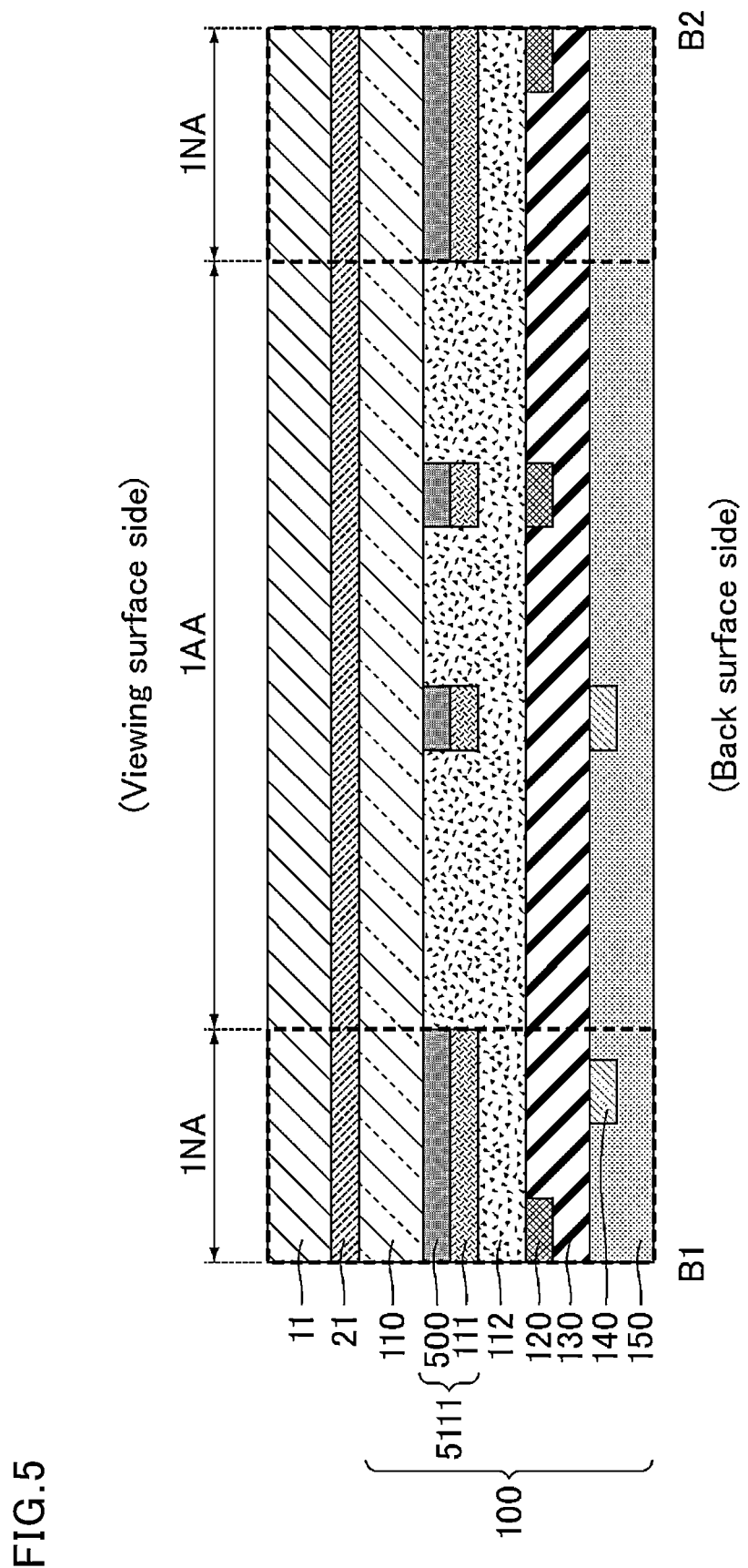
FIG. 5 is a schematic cross-sectional view taken along line B1-B2 in FIG. 4.

The present modified example describes a specific arrangement example of the reflectance-reducing layer. FIG. 3 is a schematic plan view of a liquid crystal display device of Modified Example 1 of the embodiment. FIG. 4 is a schematic enlarged plan view of the region surrounded by the broken line in FIG. 3, viewed from the viewing surface side. FIG. 5 is a schematic cross-sectional view taken along line B1-B2 in FIG. 4. FIG. 5 shows a cross section around the TFT substrate 100.

As shown in FIG. 3 to FIG. 5, the TFT substrate 100 of the present modified example sequentially includes, from the viewing surface side toward the back surface side in the frame region 1NA and the display region 1AA, the support substrate 110, a multilayer film 5111 including the reflectance-reducing layer 500 and a metal film 111 overlapping the reflectance-reducing layer 500, the insulating layer 112, the gate line layer 120, the gate insulator 130, the source line layer 140, and the interlayer insulator 150.

As shown in FIG. 5, the TFT substrate 100 of the present modified example sequentially includes, from the viewing surface side toward the back surface side in the frame region 1NA and the display region 1AA, the support substrate 110, the multilayer film 5111 including the reflectance-reducing layer 500 and the metal film 111 overlapping the reflectance-reducing layer 500, and the gate line layer 120 and the source line layer 140 as the metal line layers overlapping the multilayer film 5111. In the above embodiment, the reflectance-reducing layer 500 reduces reflection of external light on the metal line layers. Meanwhile, in the present modified example, the multilayer film 5111 can effectively reduce reflection of external light by optical interference and thus can effectively reduce deterioration of the appearance of the frame region 1NA. A specific example of the metal film 111 is a film containing at least one metal selected from Cu, Ti, W, and Mo.

As shown in FIG. 3 to FIG. 5, the TFT substrate 100 of the present modified example includes in the frame region 1NA and the display region 1AA the multilayer film 5111 in a region overlapping the gate line layer 120 and in a region overlapping the source line layer 140. This structure allows the multilayer film 5111 including the reflectance-reducing layer 500 to be provided on the entire surface of the frame region.

The insulating layer 112 is preferably a transparent insulating layer. The insulating layer 112 is an inorganic insulator, for example. Examples of the inorganic insulator include an inorganic film of silicon nitride (SiNx) or silicon oxide (SiO$_2$) (relative permittivity ε=5 to 7) or a multilayer film of such inorganic insulators.

Modified Example 2 of Embodiment

Figure 6:
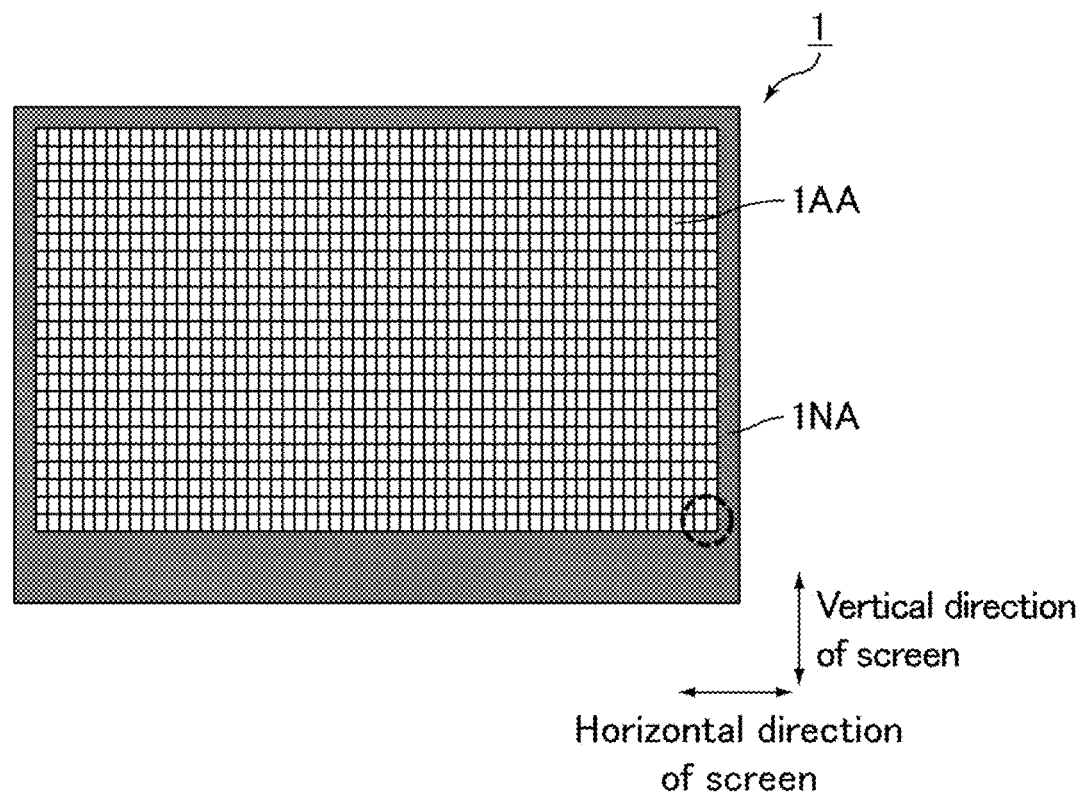
FIG. 6 is a schematic plan view of a liquid crystal display device of Modified Example 2 of the embodiment.
Figure 7:
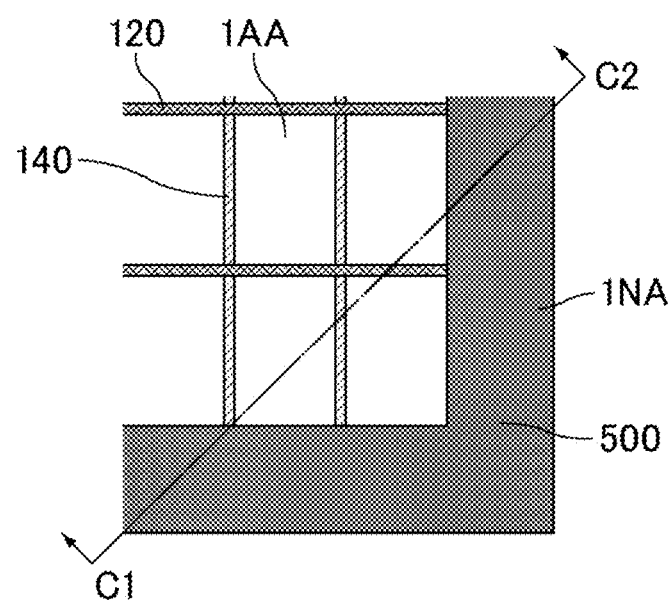
FIG. 7 is a schematic enlarged plan view of the region surrounded by the broken line in FIG. 6, viewed from the viewing surface side.
Figure 8:
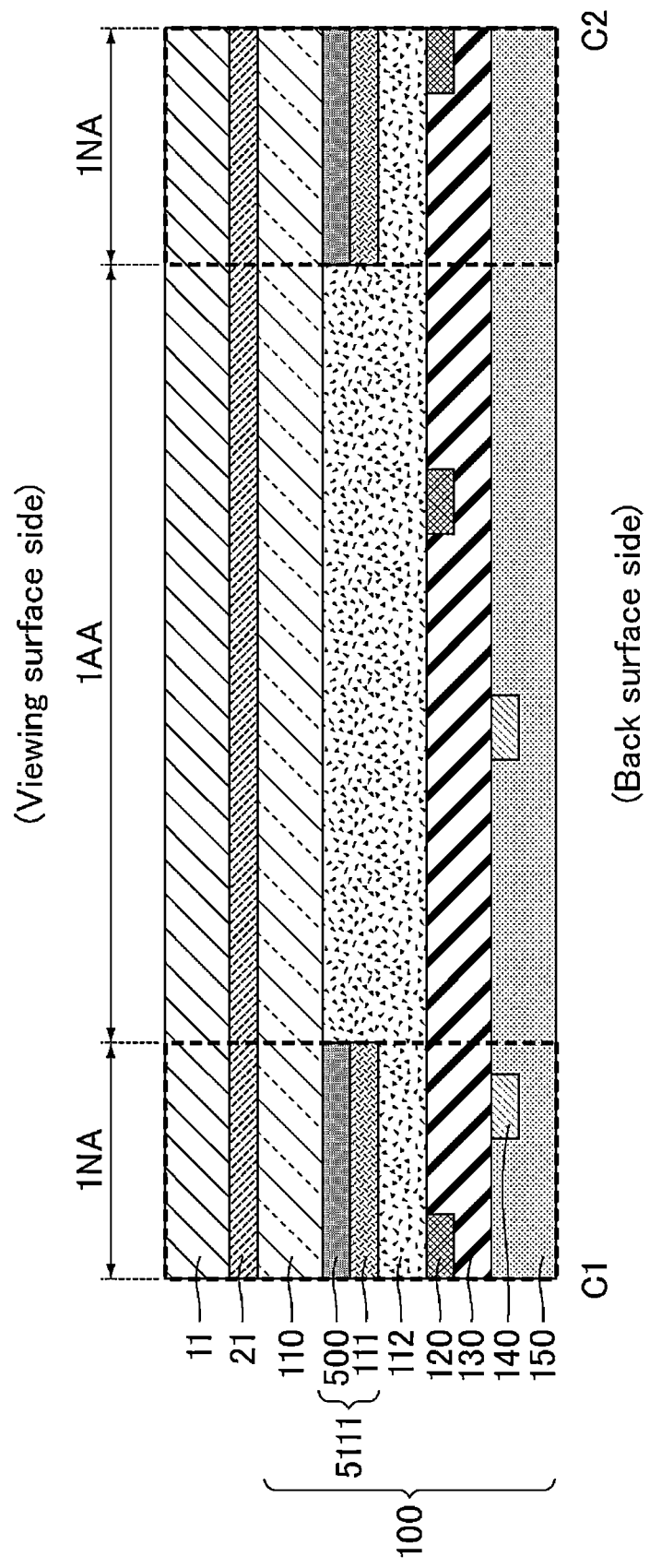
FIG. 8 is a schematic cross-sectional view taken along line C1-C2 in FIG. 7.

The present modified example describes a specific arrangement example of the reflectance-reducing layer. FIG. 6 is a schematic plan view of a liquid crystal display device of Modified Example 2 of the embodiment. FIG. 7 is a schematic enlarged plan view of the region surrounded by the broken line in FIG. 6, viewed from the viewing surface side. FIG. 8 is a schematic cross-sectional view taken along line C1-C2 in FIG. 7.

In Modified Example 1, the TFT substrate 100 includes in each of the frame region 1NA and the display region 1AA the multilayer film 5111 including the reflectance-reducing layer 500 and the metal film 111 in a region overlapping the gate line layer 120 and in a region overlapping the source line layer 140. Meanwhile, in the present modified example, as shown in FIG. 6 to FIG. 8, the TFT substrate 100 includes in the frame region 1NA the multilayer film 5111 in a region overlapping the gate line layer 120 and in a region overlapping the source line layer 140 but does not include the multilayer film 5111 in the display region 1AA. This structure allows the display region 1AA to have a simpler structure to improve the yield.

Modified Example 3 of Embodiment

Figure 9:
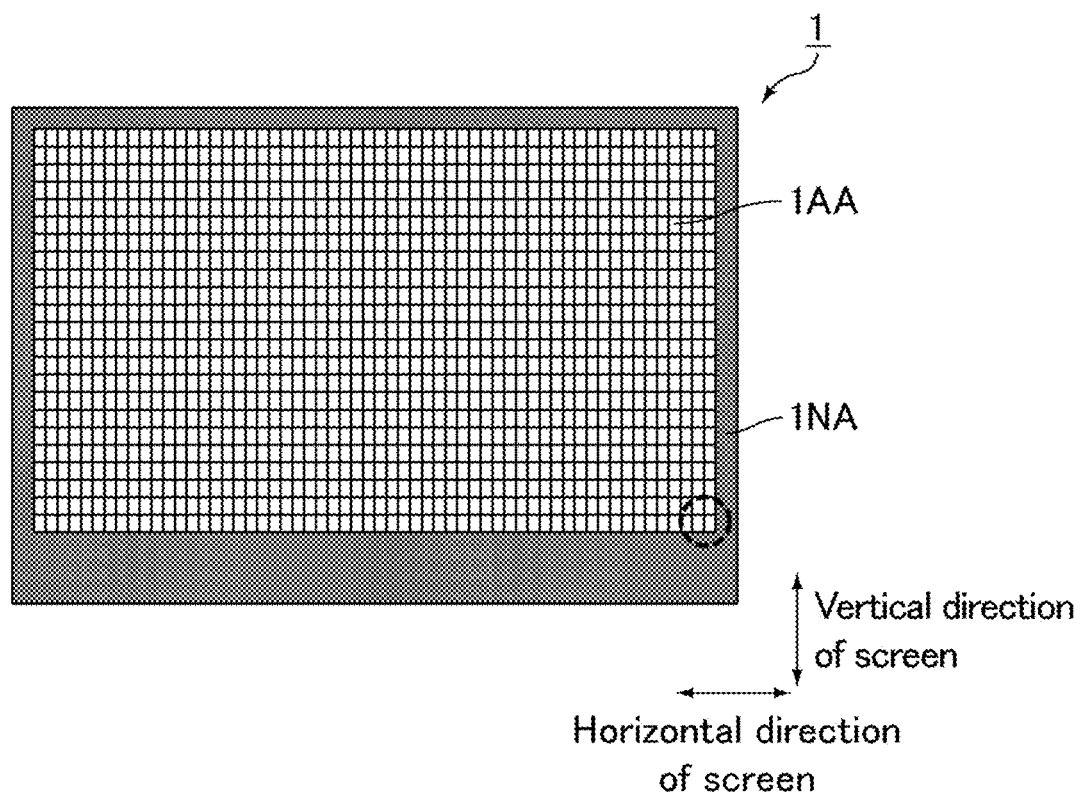
FIG. 9 is a schematic plan view of a liquid crystal display device of Modified Example 3 of the embodiment.
Figure 10:
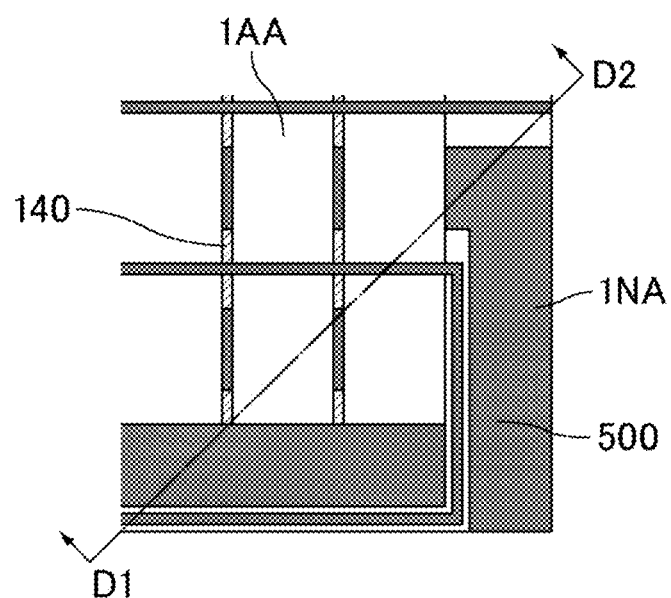
FIG. 10 is a schematic enlarged plan view of the region surrounded by the broken line in FIG. 9, viewed from the viewing surface side.
Figure 11:
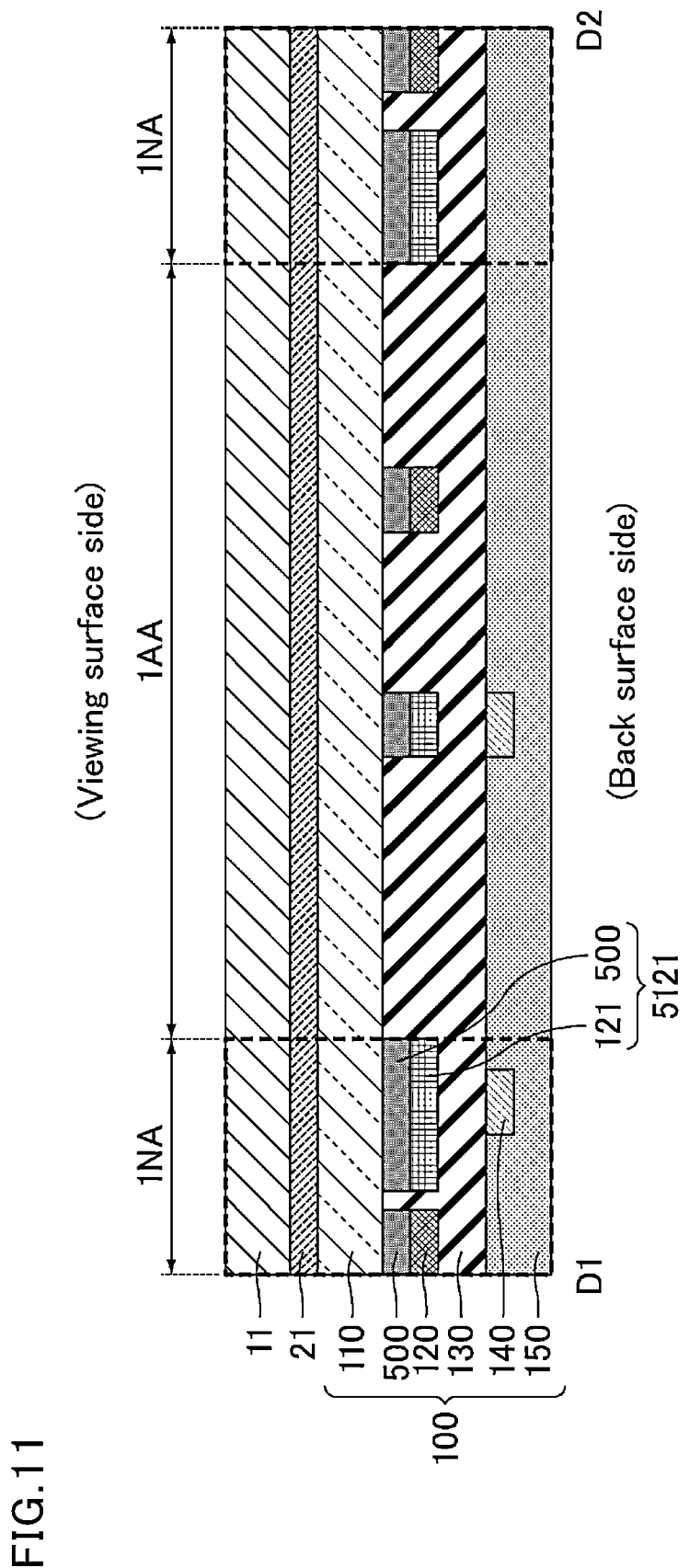
FIG. 11 is a schematic cross-sectional view taken along line D1-D2 in FIG. 10.

The present modified example describes a specific arrangement example of the reflectance-reducing layer. FIG. 9 is a schematic plan view of a liquid crystal display device of Modified Example 3 of the embodiment. FIG. 10 is a schematic enlarged plan view of the region surrounded by the broken line in FIG. 9, viewed from the viewing surface side. FIG. 11 is a schematic cross-sectional view taken along line D1-D2 in FIG. 10.

As shown in FIG. 9 to FIG. 11, in the frame region 1NA and the display region 1AA, the TFT substrate 100 of the present modified example sequentially includes from the viewing surface side toward the back surface side the support substrate 110, the reflectance-reducing layer 500, float electrodes 121, the gate insulator 130, the source line layer 140, and the interlayer insulator 150.

As shown in FIG. 11, the TFT substrate 100 of the present modified example sequentially includes, from the viewing surface side toward the back surface side in the frame region 1NA and the display region 1AA, the support substrate 110, a multilayer film 5121 including the reflectance-reducing layer 500 and the float electrodes 121 overlapping the reflectance-reducing layer 500, and the source line layer 140 as the metal line layer overlapping the multilayer film 5121. In the above embodiment, the reflectance-reducing layer 500 reduces reflection of external light on the metal line layers. Meanwhile, in the present modified example, the multilayer film 5121 can effectively reduce reflection of external light by optical interference and thus can effectively reduce deterioration of the appearance of the frame region 1NA. A specific example of each float electrode 121 is a film containing at least one metal selected from Cu, Ti, W, and Mo.

The float electrodes 121 are a conductive layer that is disposed in the same layer as for the gate line layer 120 and is not connected to the gate line layer 120.

As shown in FIG. 9 to FIG. 11, the TFT substrate 100 of the present modified example includes in the frame region 1NA and the display region 1AA the multilayer film 5121 in a region overlapping the source line layer 140. This structure can reduce the number of layers as compared to Modified Examples 1 and 2 to achieve an inexpensive structure.

In Modified Example 1, in the frame region 1NA and the display region 1AA, the gate line layer 120 and the source line layer 140 as the metal line layers both overlap the multilayer film 5111. Meanwhile, in the present modified example, the gate line layer 120 does not overlap the multilayer film 5121 while the source line layer 140 overlaps the multilayer film 5121. The reflection of external light on the metal line layer(s) can be more effectively reduced by the multilayer films 5111 and 5121, each including the reflectance-reducing layer 500, than the reflectance-reducing layer 500 alone. Accordingly, Modified Example 1 can more effectively reduce deterioration of the appearance of the frame region 1NA than Modified Example 3.

Modified Example 4 of Embodiment

Figure 12:
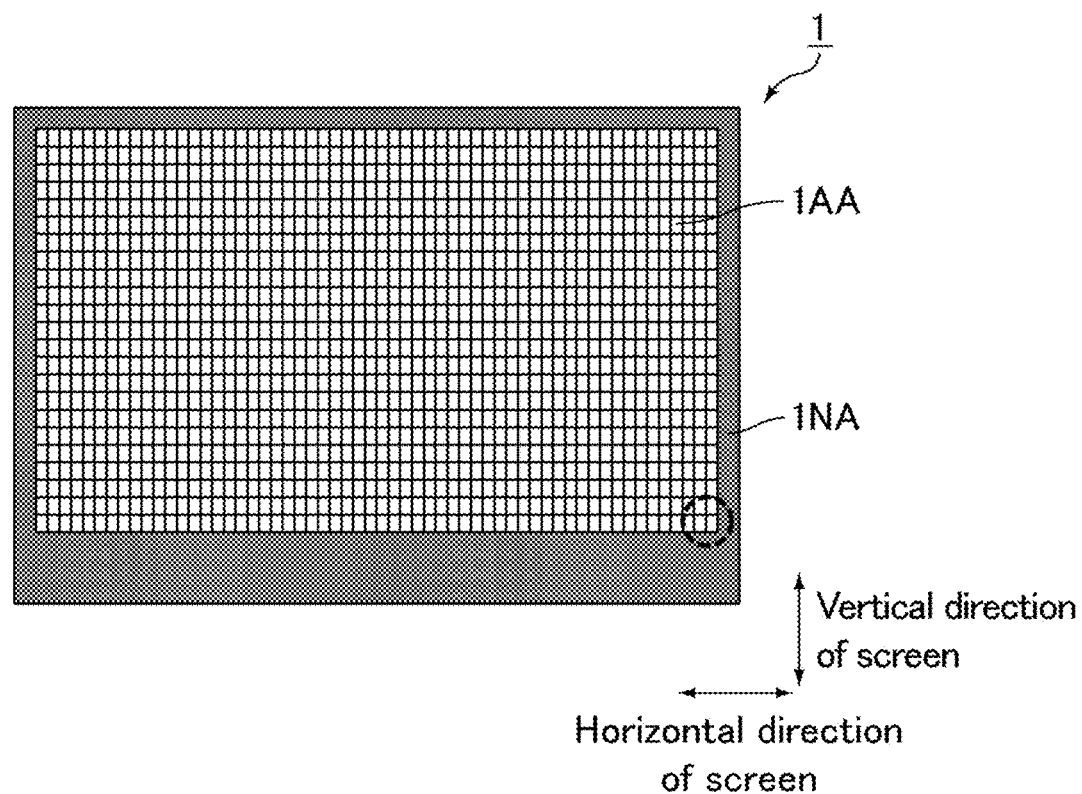
FIG. 12 is a schematic plan view of a liquid crystal display device of Modified Example 4 of the embodiment.
Figure 13:
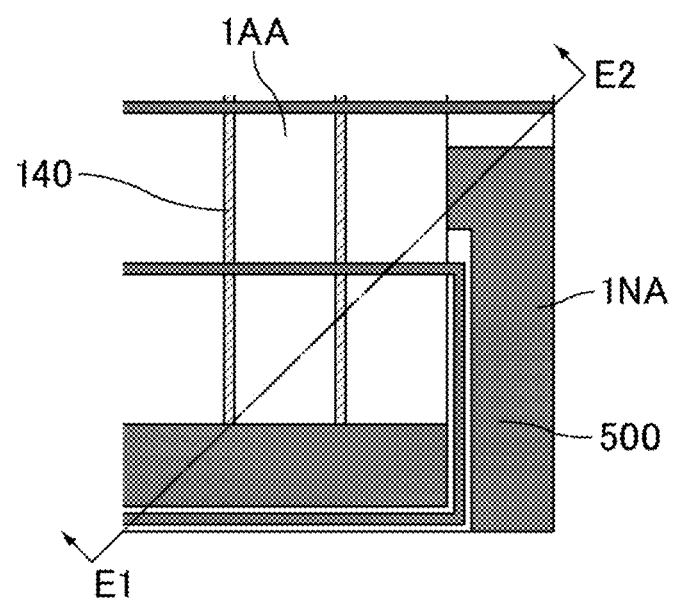
FIG. 13 is a schematic enlarged plan view of the region surrounded by the broken line in FIG. 12, viewed from the viewing surface side.
Figure 14:
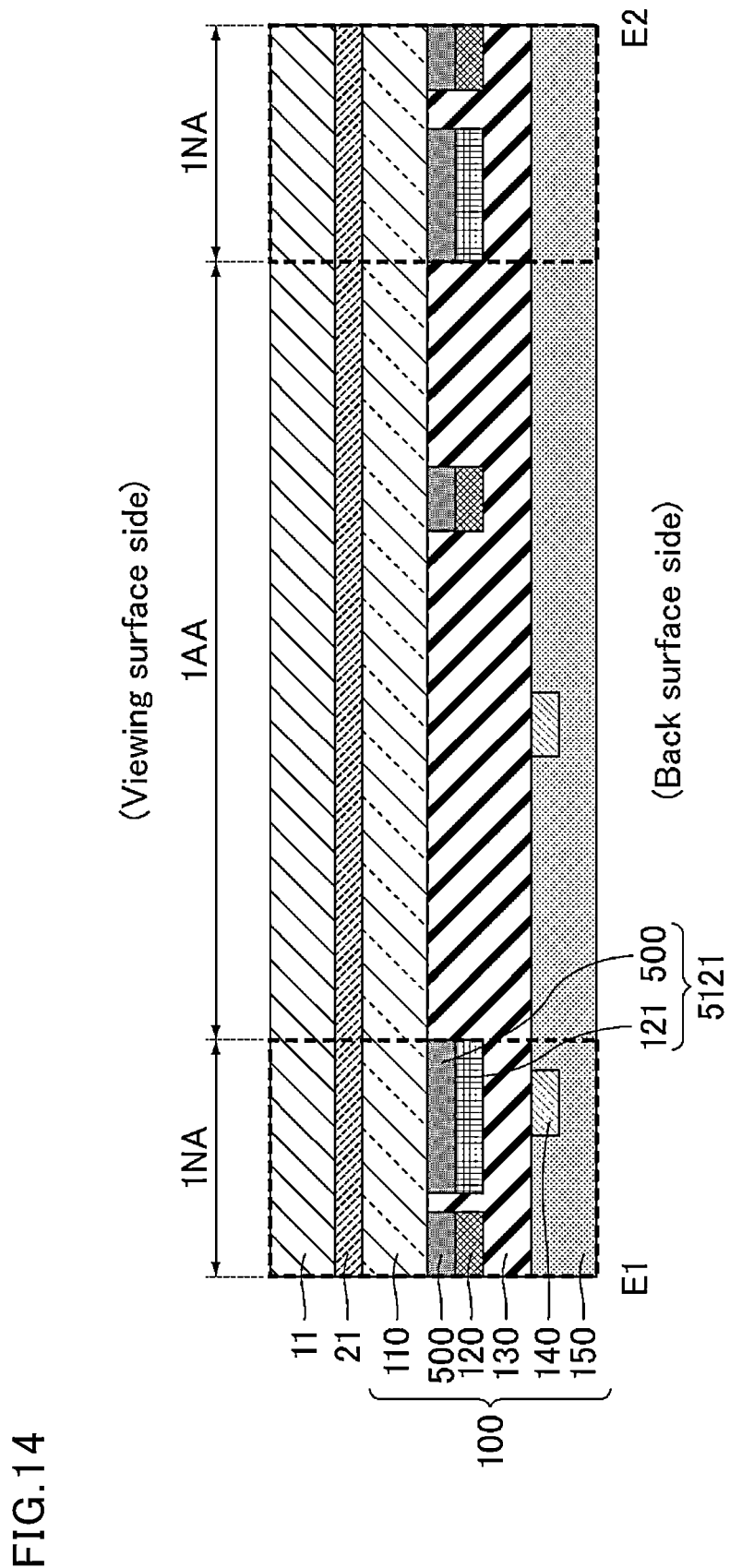
FIG. 14 is a schematic cross-sectional view taken along line E1-E2 in FIG. 13.

The present modified example describes a specific arrangement example of the reflectance-reducing layer. FIG. 12 is a schematic plan view of a liquid crystal display device of Modified Example 4 of the embodiment. FIG. 13 is a schematic enlarged plan view of the region surrounded by the broken line in FIG. 12, viewed from the viewing surface side. FIG. 14 is a schematic cross-sectional view taken along line E1-E2 in FIG. 13.

In Modified Example 3, the TFT substrate 100 includes in the frame region 1NA and the display region 1AA the multilayer film 5121 in a region overlapping the source line layer 140. Meanwhile, in the present modified example, as shown in FIG. 12 to FIG. 14, the frame region 1NA includes the multilayer film 5121 in a region overlapping the source line layer 140 but not in the display region 1AA. This structure can reduce the risk of leakage failure between the gate lines 101.

In Modified Example 2, in the frame region 1NA, the gate line layer 120 and the source line layer 140 as the metal line layers both overlap the multilayer film 5111. Meanwhile, in the present modified example, the gate line layer 120 does not overlap the multilayer film 5121 while the source line layer 140 overlaps the multilayer film 5121. The reflection of external light on the metal line layer(s) can be more effectively reduced by the multilayer films 5111 and 5121, each including the reflectance-reducing layer 500, than the reflectance-reducing layer 500 alone. Accordingly, Modified Example 2 can more effectively reduce deterioration of the appearance of the frame region 1NA than the Modified Example 4.

Modified Example 5 of Embodiment

Figure 15:
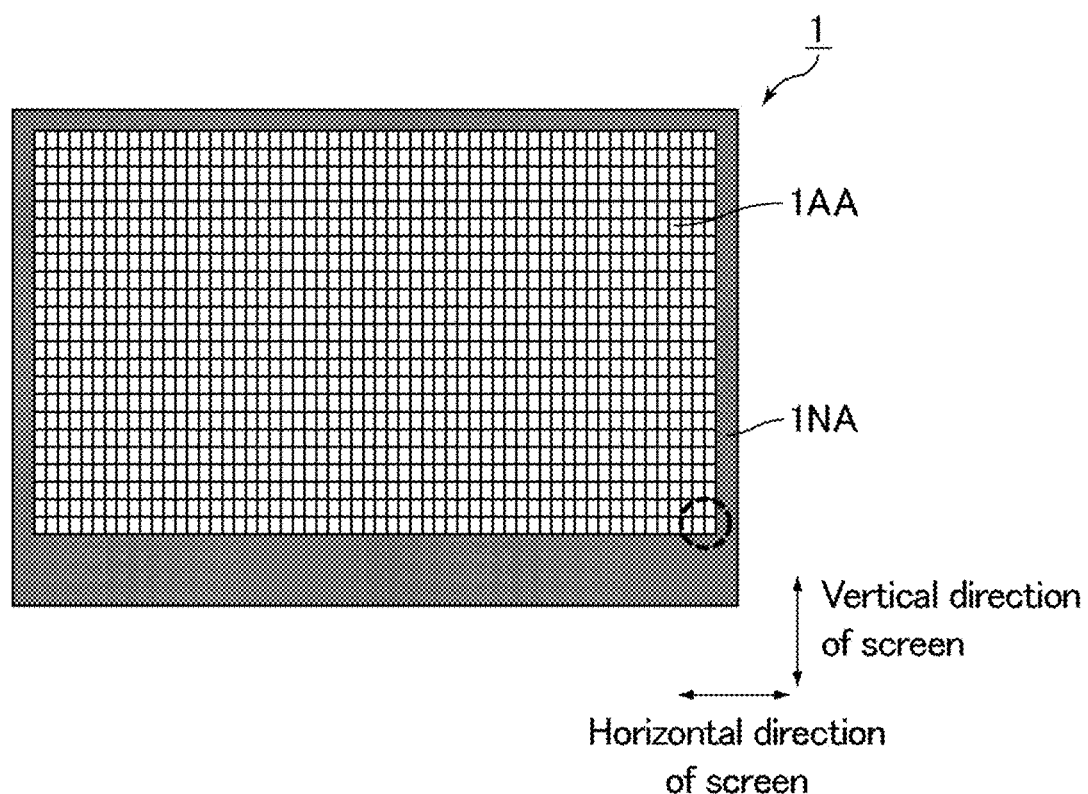
FIG. 15 is a schematic plan view of a liquid crystal display device of Modified Example 5 of the embodiment.
Figure 16:
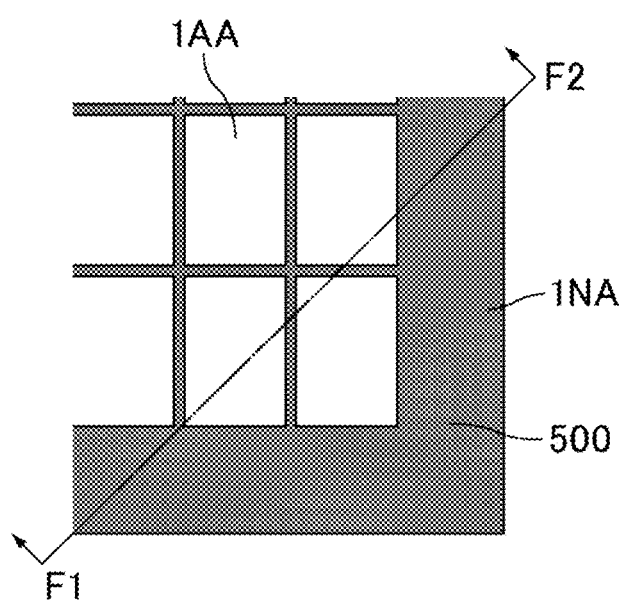
FIG. 16 is a schematic enlarged plan view of the region surrounded by the broken line in FIG. 15, viewed from the viewing surface side.
Figure 17:
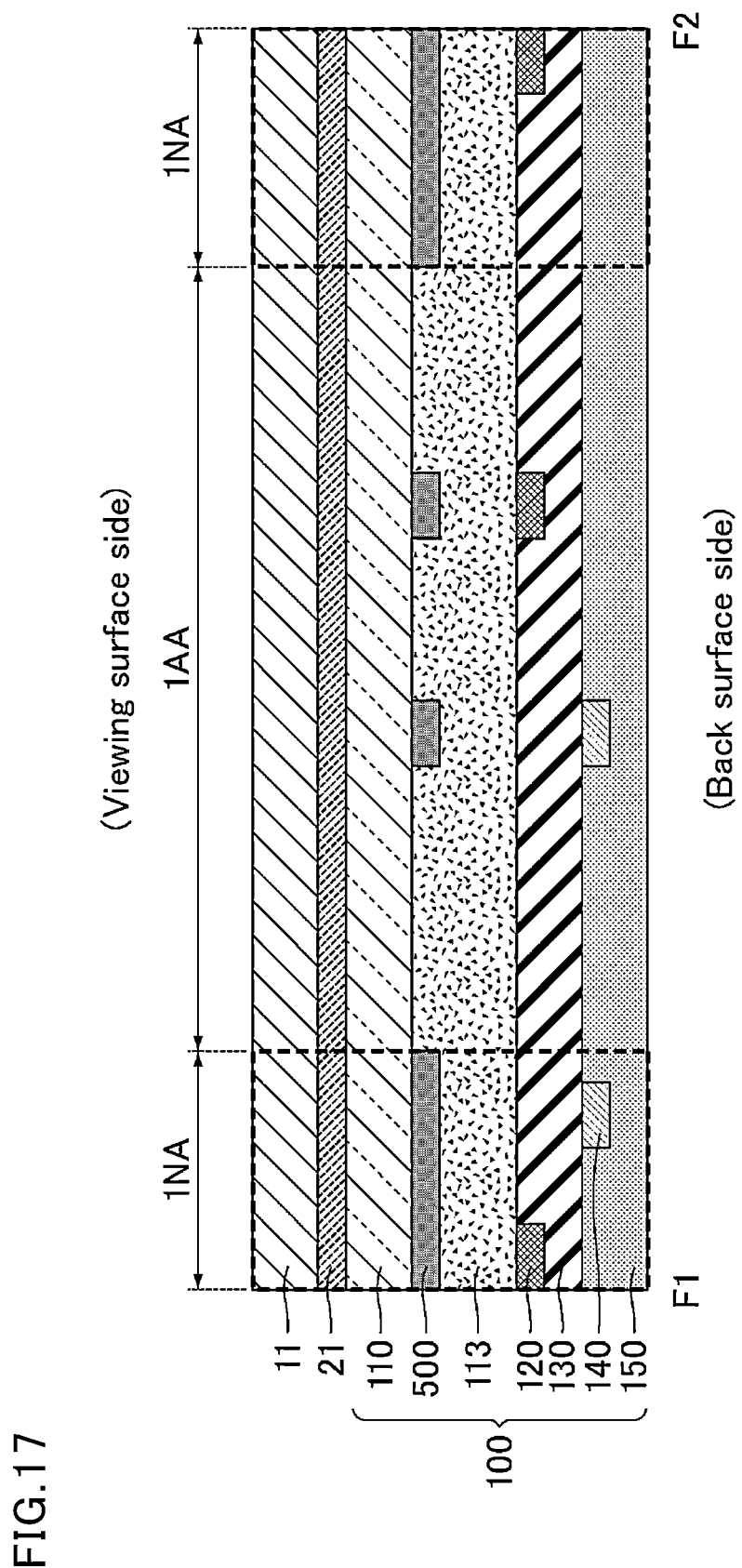
FIG. 17 is a schematic cross-sectional view taken along line F1-F2 in FIG. 16.

The present modified example describes a specific arrangement example of the reflectance-reducing layer. FIG. 15 is a schematic plan view of a liquid crystal display device of Modified Example 5 of the embodiment. FIG. 16 is a schematic enlarged plan view of the region surrounded by the broken line in FIG. 15, viewed from the viewing surface side. FIG. 17 is a schematic cross-sectional view taken along line F1-F2 in FIG. 16.

As shown in FIG. 15 to FIG. 17, the TFT substrate 100 of the present modified example sequentially includes, from the viewing surface side toward the back surface side in the frame region 1NA and the display region 1AA, the support substrate 110, the reflectance-reducing layer 500, an overcoat layer 113 as an insulating layer, the gate line layer 120, the gate insulator 130, the source line layer 140, and the interlayer insulator 150.

As shown in FIG. 17, the TFT substrate 100 of the present modified example includes in the frame region 1NA and the display region 1AA the support substrate 110, the reflectance-reducing layer 500, the overcoat layer 113, and the gate line layer 120 and the source line layer 140 as the metal lines overlap the reflectance-reducing layer 500. This structure can prevent change in optical properties, which is caused by contact between the reflectance-reducing layer 500 and components such as metal line layers and insulators particularly in the case of using an organic film as the reflectance-reducing layer 500.

The overcoat layer 113 may be an organic film (dielectric constant $\varepsilon$=3 to 4), for example. The overcoat layer can be formed by a method including application of a photocurable resin, irradiation with ultraviolet light, and baking.

Modified Example 6 of Embodiment

Figure 18:
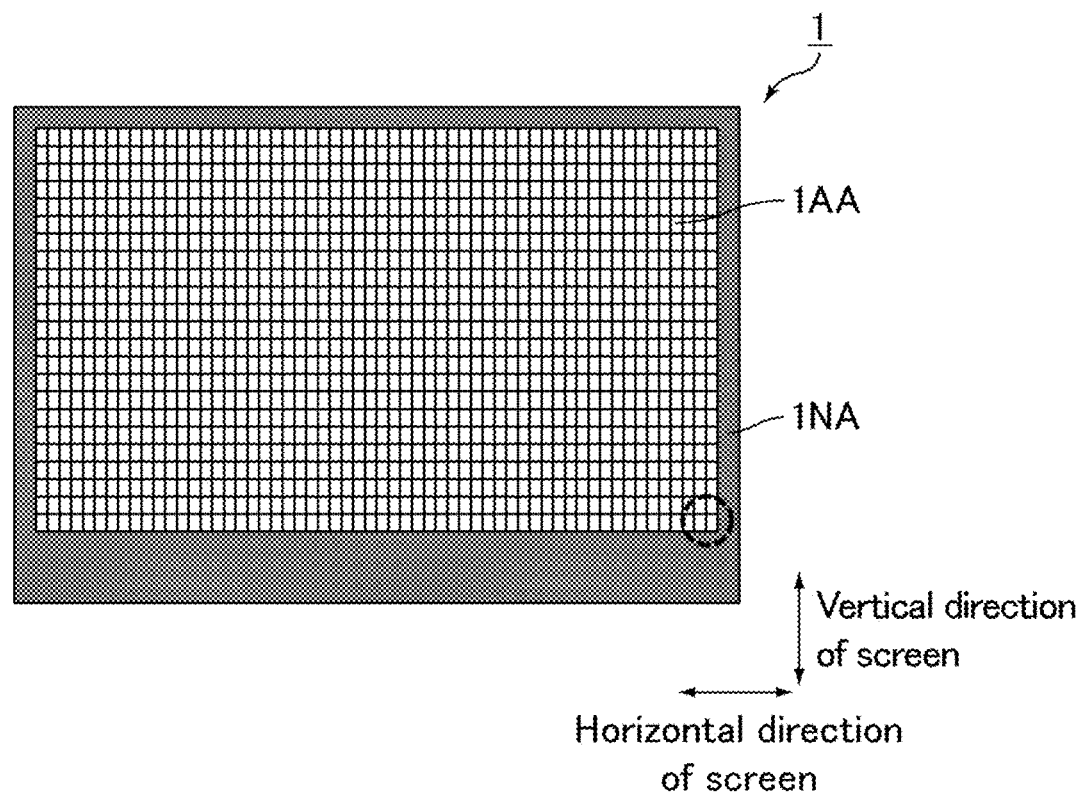
FIG. 18 is a schematic plan view of a liquid crystal display device of Modified Example 6 of the embodiment.
Figure 19:
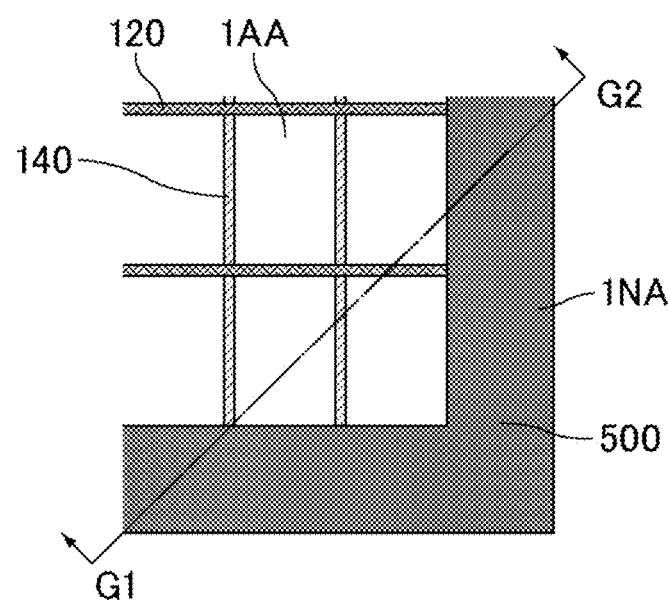
FIG. 19 is a schematic enlarged plan view of the region surrounded by the broken line in FIG. 18, viewed from the viewing surface side.
Figure 20:
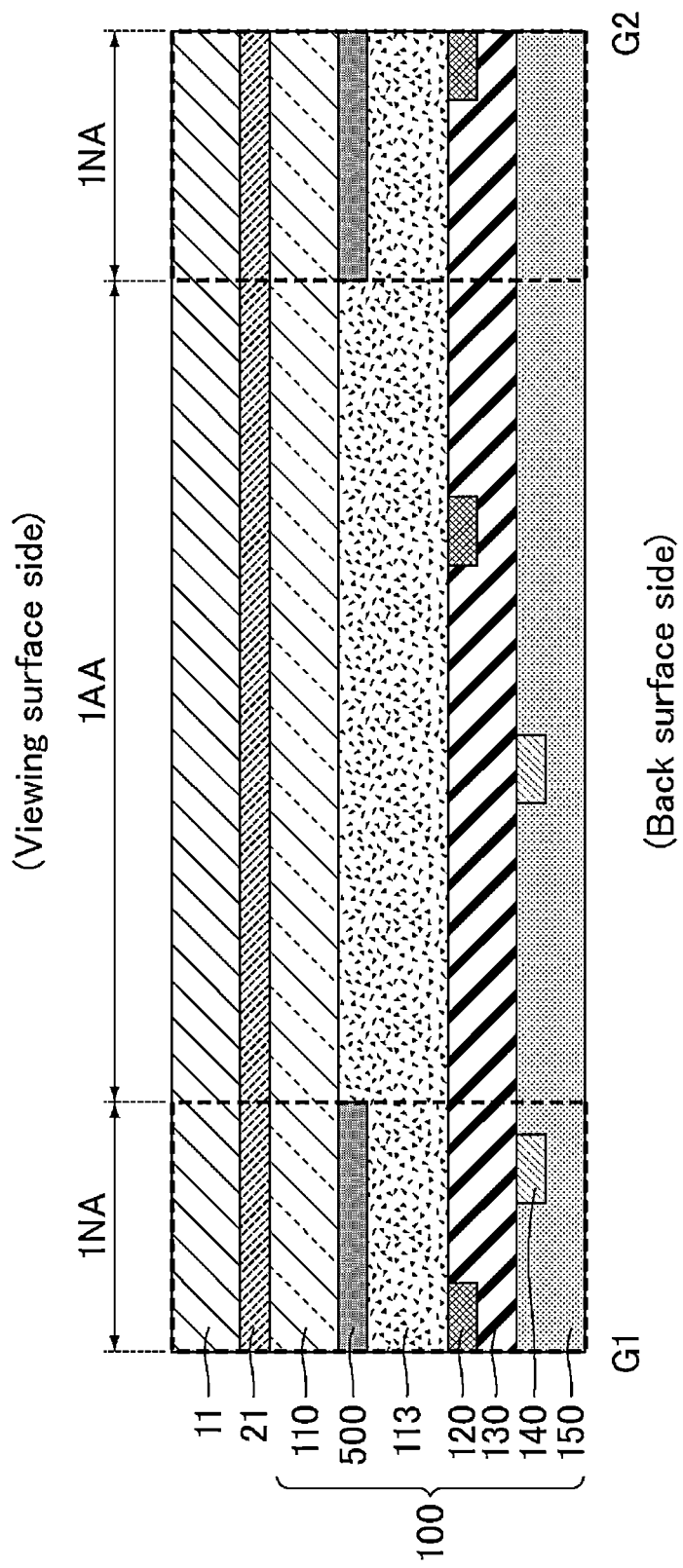
FIG. 20 is a schematic cross-sectional view taken along line G1-G2 in FIG. 19.

The present modified example describes a specific arrangement example of the reflectance-reducing layer. FIG. 18 is a schematic plan view of a liquid crystal display device of Modified Example 6 of the embodiment. FIG. 19 is a schematic enlarged plan view of the region surrounded by the broken line in FIG. 18, viewed from the viewing surface side. FIG. 20 is a schematic cross-sectional view taken along line G1-G2 in FIG. 19.

In Modified Example 5, the TFT substrate 100 includes in each of the frame region 1NA and the display region 1AA the reflectance-reducing layer 500 in a region overlapping the gate line layer 120 and in a region overlapping the source line layer 140. Meanwhile, in the present modified example, as shown in FIG. 18 to FIG. 20, the TFT substrate 100 includes in the frame region 1NA the reflectance-reducing layer 500 in a region overlapping the gate line layer 120 and in a region overlapping the source line layer 140 but does not include the reflectance-reducing layer 500 in the display region 1AA. This structure allows the display region 1AA to have a simpler structure to improve the yield.

The present invention is described in further detail with reference to examples and comparative examples below, but the present invention is not limited to these examples.

Example 1-1-1 and Example 1-1-2

Each of liquid crystal display devices 1 of Example 1-1-1 and Example 1-1-2 corresponding to Modified Example 1 of the embodiment was produced. In Example 1-1-1, the reflectance-reducing layer 500 used was a film that contained an alloy containing CuMo and had a viewing surface side reflectance of 30% and a transmittance of 40%. In Example 1-1-2, the reflectance-reducing layer 500 used was a SiNx film that had a viewing surface side reflectance of 5% and a transmittance of 95%. In Example 1-1-1 and Example 1-1-2, the gate line layer 120 and the source line layer 140 each had a viewing surface side reflectance of 40%, and the insulating layer 112 used was a transparent insulating layer.

The TFT substrate 100 and the CF substrate 200 were produced each of which had a structure similar to that (of the corresponding substrate) in a typical liquid crystal display device, and were then attached together with a liquid crystal material in between, whereby a liquid crystal panel was produced which included the TFT substrate 100, the liquid crystal layer 300, and the CF substrate 200. To the liquid crystal panel, the first polarizing plate 11 was attached on the viewing surface side of the TFT substrate 100 via the first adhesive layer 21, and the second polarizing plate 12 was attached on the back surface side of the CF substrate 200 via the second adhesive layer 22. Finally, a backlight was disposed on the back surface side of the second polarizing plate 12, whereby each of the liquid crystal display devices 1 of Example 1-1-1 and Example 1-1-2 was produced.

Example 1-2-1 and Example 1-2-2

Each of liquid crystal display devices 1 of Example 1-2-1 and Example 1-2-2 corresponding to Modified Example 2 of the embodiment was produced. In Example 1-2-1, the reflectance-reducing layer 500 used was the same film as used in Example 1-1-1. In Example 1-2-2, the reflectance-reducing layer 500 used was the same SiNx film as used in Example 1-1-2. In Example 1-2-1 and Example 1-2-2, each of the gate line layer 120 and the source line layer 140 used had the same viewing surface side reflectance as that of Example 1-1-1, and the insulating layer 112 used was a transparent insulating layer.

The TFT substrate 100 and the CF substrate 200 were produced each of which had a structure similar to that (of the corresponding substrate) in a typical liquid crystal display device, and were then attached together with a liquid crystal material in between, whereby a liquid crystal panel was produced which included the TFT substrate 100, the liquid crystal layer 300, and the CF substrate 200. To the liquid crystal panel, the first polarizing plate 11 was attached on the viewing surface side of the TFT substrate 100 via the first adhesive layer 21, and the second polarizing plate 12 was attached on the back surface side of the CF substrate 200 via the second adhesive layer 22. Finally, a backlight was disposed on the back surface side of the second polarizing plate 12, whereby each of the liquid crystal display devices 1 of Example 1-2-1 and Example 1-2-2 was produced.

Differently from Example 1-1-1 and Example 1-1-2, the reflectance-reducing layer 500 of each of the liquid crystal display devices of Example 1-2-1 and Example 1-2-2 was disposed in the frame region alone and was not disposed in the line portion (display region).

Example 2-1-1 and Example 2-1-2

Each of liquid crystal display devices 1 of Example 2-1-1 and Example 2-1-2 corresponding to Modified Example 3 of the embodiment was produced. In Example 2-1-1, the reflectance-reducing layer 500 used was the same film as used in Example 1-1-1. In Example 2-1-2, the reflectance-reducing layer 500 used was the same SiNx film as used in Example 1-1-2. In Example 2-1-1 and Example 2-1-2, each of the gate line layer 120 and the source line layer 140 used had the same viewing surface side reflectance as that of Example 1-1-1.

The TFT substrate 100 and the CF substrate 200 were produced each of which had a structure similar to that (of the corresponding substrate) in a typical liquid crystal display device, and were then attached together with a liquid crystal material in between, whereby a liquid crystal panel was produced which included the TFT substrate 100, the liquid crystal layer 300, and the CF substrate 200. To the liquid crystal panel, the first polarizing plate 11 was attached on the viewing surface side of the TFT substrate 100 via the first adhesive layer 21, and the second polarizing plate 12 was attached on the back surface side of the CF substrate 200 via the second adhesive layer 22. Finally, a backlight was disposed on the back surface side of the second polarizing plate 12, whereby each of the liquid crystal display devices 1 of Example 2-1-1 and Example 2-1-2 was produced.

In Example 2-1-1 and Example 2-1-2, in patterning of the gate line layer 120 (lowermost layer metal), an additional gate line layer 120 (lowermost layer metal) was disposed in a blank region without the original gate line layer 120 (lowermost layer metal) in the frame region 1NA and in a layer below the source line 102 in the active area (display region 1AA). Here, the additional gate line layer 120 was patterned as a float electrode 121 that was not electrically connected to the originally patterned gate line layer 120 (lowermost layer metal).

Example 2-2-1 to Example 2-2-2

Each of liquid crystal display devices 1 of Example 2-2-1 and Example 2-2-2 corresponding to Modified Example 4 of the embodiment was produced. In Example 2-2-1, the reflectance-reducing layer 500 used was the same film as used in Example 1-1-1. In Example 2-2-2, the reflectance-reducing layer 500 used was the same SiNx film as used in Example 1-1-2. In Example 2-2-1 and Example 2-2-2, each of the gate line layer 120 and the source line layer 140 used had the same viewing surface side reflectance as that of Example 1-1-1.

The TFT substrate 100 and the CF substrate 200 were produced each of which had a structure similar to that (of the corresponding substrate) in a typical liquid crystal display device, and were then attached together with a liquid crystal material in between, whereby a liquid crystal panel was produced which included the TFT substrate 100, the liquid crystal layer 300, and the CF substrate 200. To the liquid crystal panel, the first polarizing plate 11 was attached on the viewing surface side of the TFT substrate 100 via the first adhesive layer 21, and the second polarizing plate 12 was attached on the back surface side of the CF substrate 200 via the second adhesive layer 22. Finally, a backlight was disposed on the back surface side of the second polarizing plate 12, whereby each of the liquid crystal display devices 1 of Example 2-2-1 and Example 2-2-2 was produced.

In Example 2-2-1 and Example 2-2-2, in patterning of the gate line layer 120 (lowermost layer metal), an additional gate line layer 120 (lowermost layer metal) was disposed in a blank region without the original gate line layer 120 (lowermost layer metal) in the frame region 1NA. Here, the additional gate line layer 120 was patterned as a float electrode 121 that was not electrically connected to the originally patterned gate line layer 120 (lowermost layer metal).

Example 3-1-1 to Example 3-1-3

Each of liquid crystal display devices 1 of Example 3-1-1 to Example 3-1-3 corresponding to Modified Example 5 of the embodiment was produced. In Example 3-1-1, the reflectance-reducing layer 500 used was a carbon black-containing organic film (CB-containing resin film). In Example 3-1-2, the reflectance-reducing layer 500 used was a liquid crystal organic film (retardation film) that provides a retardation to transmitted light. In Example 3-1-2, the reflectance-reducing layer 500 used was a liquid crystal organic film (polarizing film) that provides polarization to transmitted light. The reflectance-reducing layer 500 used in Example 3-1-1 had a viewing surface side reflectance of 5% and a transmittance of 10%. The reflectance-reducing layer 500 used in Example 3-1-2 had a viewing surface side reflectance of 5% and a transmittance of 90%. The reflectance-reducing layer 500 used in Example 3-1-3 had a viewing surface side reflectance of 5% and a transmittance of 40%.

Moreover, in Example 3-1-1 to Example 3-1-3, the overcoat layer 113 covering the reflectance-reducing layer 500 was formed. In Example 3-1-1 to Example 3-1-3, each of the same gate line layer 120 and source line layer 140 used had the same viewing surface side reflectance as that of Example 1-1-1.

The TFT substrate 100 and the CF substrate 200 were produced each of which had a structure similar to that (of the corresponding substrate) in a typical liquid crystal display device, and were then attached together with a liquid crystal material in between, whereby a liquid crystal panel was produced which included the TFT substrate 100, the liquid crystal layer 300, and the CF substrate 200. To the liquid crystal panel, the first polarizing plate 11 was attached on the viewing surface side of the TFT substrate 100 via the first adhesive layer 21, and the second polarizing plate 12 was attached on the back surface side of the CF substrate 200 via the second adhesive layer 22. Finally, a backlight was disposed on the back surface side of the second polarizing plate 12, whereby each of the liquid crystal display devices 1 of Example 3-1-1 to Example 3-1-3 was produced.

Example 3-2-1 to Example 3-2-3

Each of liquid crystal display devices 1 of Example 3-2-1 to Example 3-2-3 corresponding to Modified Example 6 of the embodiment was produced. In Example 3-2-1, the reflectance-reducing layer 500 used was the same CB-containing resin film as used in Example 3-1-1. In Example 3-2-2, the reflectance-reducing layer 500 used was the same retardation film as used in Example 3-1-2. In Example 3-2-3, the reflectance-reducing layer 500 used was the same polarizing film as used in Example 3-1-3. Furthermore, in Example 3-2-1 to Example 3-2-3, the overcoat layer 113 covering the reflectance-reducing layer 500 was formed. In Example 3-2-1 to Example 3-2-3, each of the gate line layer 120 and the source line layer 140 used had the same viewing surface side reflectance as that of Example 1-1-1.

The TFT substrate 100 and the CF substrate 200 were produced each of which had a structure similar to that (of the corresponding substrate) in a typical liquid crystal display device, and were then attached together with a liquid crystal material in between, whereby a liquid crystal panel was produced which included the TFT substrate 100, the liquid crystal layer 300, and the CF substrate 200. To the liquid crystal panel, the first polarizing plate 11 was attached on the viewing surface side of the TFT substrate 100 via the first adhesive layer 21, and the second polarizing plate 12 was attached on the back surface side of the CF substrate 200 via the second adhesive layer 22. Finally, a backlight was disposed on the back surface side of the second polarizing plate 12, whereby each of the liquid crystal display devices 1 of Example 3-2-1 to Example 3-2-3 was produced.

Differently from 3-1-1 to Example 3-1-3, the reflectance-reducing layer 500 of each of the liquid crystal display devices of Example 3-2-1 to Example 3-2-3 was disposed in the frame region alone and was not disposed in the active area (display region).

Comparative Example 1-1 and Comparative Example 1-2

Figure 21:
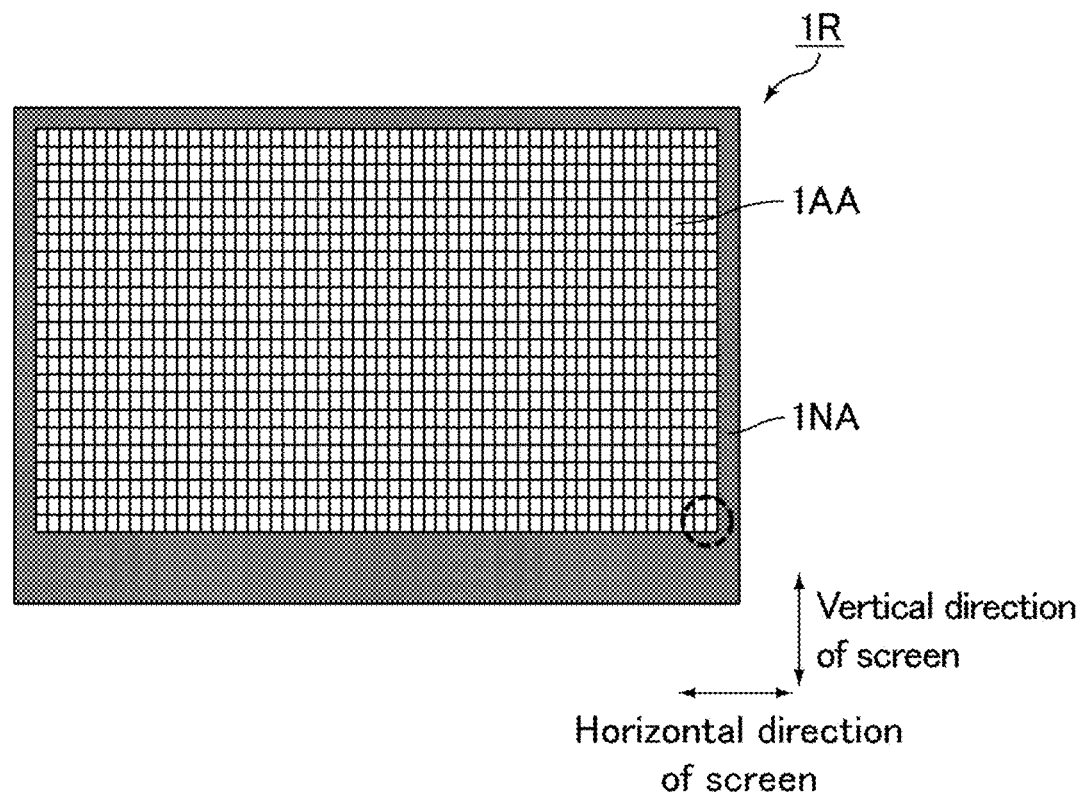
FIG. 21 is a schematic plan view of a liquid crystal display device of each of Comparative Example 1-1 and Comparative Example 1-2.
Figure 22:
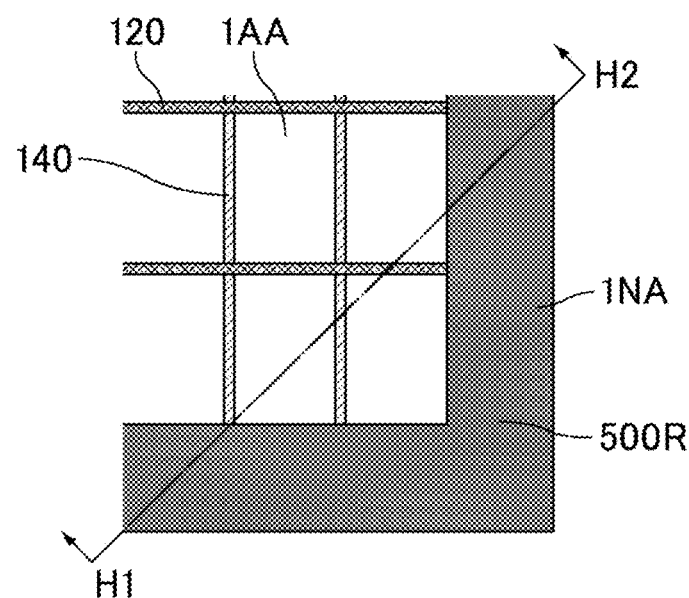
FIG. 22 is a schematic enlarged plan view of the region surrounded by the broken line in FIG. 21, viewed from the viewing surface side.
Figure 23:
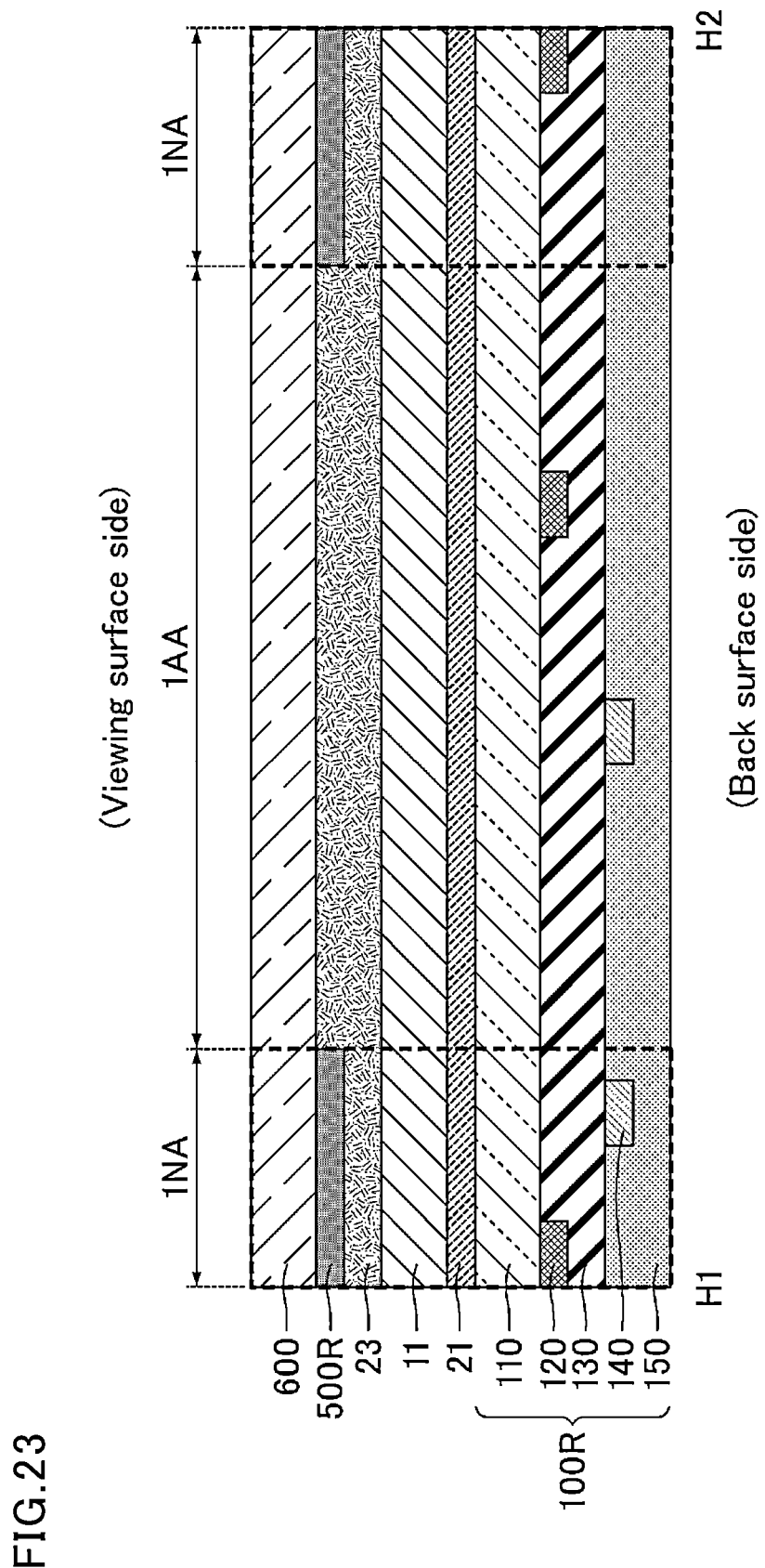
FIG. 23 is a schematic cross-sectional view taken along line H1-H2 in FIG. 22.

FIG. 21 is a schematic plan view of a liquid crystal display device of each of Comparative Example 1-1 and Comparative Example 1-2. FIG. 22 is a schematic enlarged plan view of the region surrounded by the broken line in FIG. 21, viewed from the viewing surface side. FIG. 23 is a schematic cross-sectional view taken along line H1-H2 in FIG. 22.

Each of liquid crystal display devices 1R of Comparative Example 1-1 and Comparative Example 1-2 as shown in FIG. 21 to FIG. 23 was produced. The TFT substrate 100R of each of the liquid crystal display devices 1R of Comparative Example 1-1 and Comparative Example 1-2 sequentially included from the viewing surface side toward the back surface side the support substrate 110, the gate line layer 120, the gate insulator 130, the source line layer 140, and the interlayer insulator 150.

The TFT substrate 100R and a CF substrate were produced each of which had a structure similar to that (of the corresponding substrate) in a typical liquid crystal display device, and were then attached together with a liquid crystal material in between, whereby a liquid crystal panel was produced which included the TFT substrate 100R, a liquid crystal layer, and the CF substrate. To the liquid crystal panel, the first polarizing plate 11 was attached on the viewing surface side of the TFT substrate 100R via the first adhesive layer 21, and a second polarizing plate was attached on the back surface side of the CF substrate via a second adhesive layer. Furthermore, cover glass 600 provided with a design printed with the print ink 500R of black color in the frame region 1NA was attached to the viewing surface side of the first polarizing plate 11 via a third adhesive layer 23. Finally, a backlight was disposed on the back surface side of the second polarizing plate, whereby each of the liquid crystal display devices 1R of Comparative Example 1-1 and Comparative Example 1-2 was produced. The print ink 500R had a viewing surface side reflectance of 5% and a transmittance of 0.1%. In Comparative Example 1-1 and Comparative Example 1-2, each of the gate line layer 120 and the source line layer 140 used had the same viewing surface side reflectance as that of Example 1-1-1.

In Comparative Example 1-1, the third adhesive layer 23 had a thickness of 100 μm (was a high-cost product), while in Comparative Example 1-2, the third adhesive layer 23 had a thickness of 25 μm (was a general-purpose product).

Comparative Example 2

Figure 24:
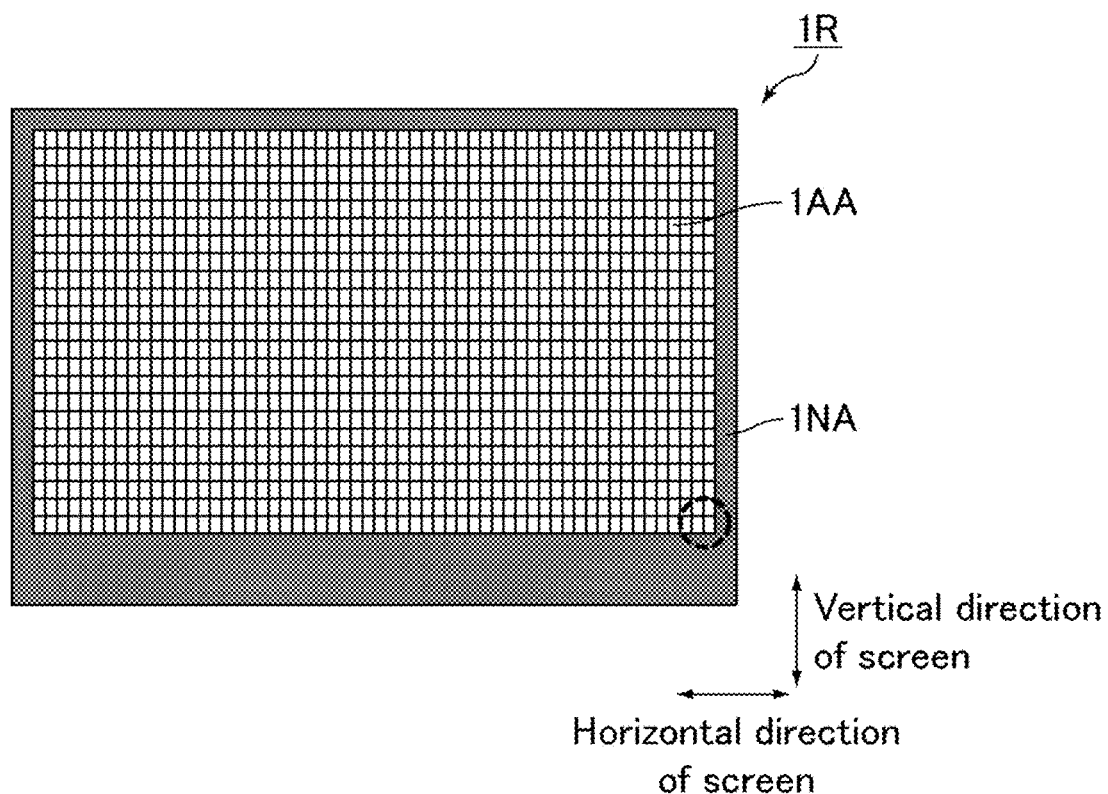
FIG. 24 is a schematic plan view of a liquid crystal display device of Comparative Example 2.
Figure 25:
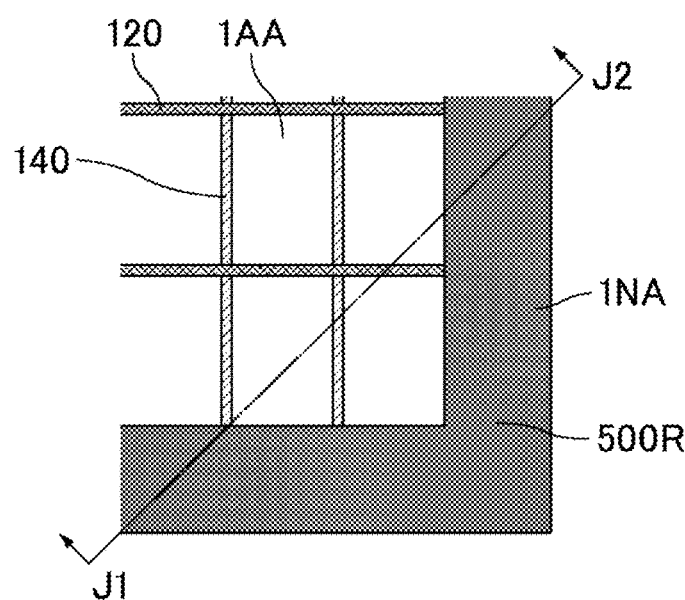
FIG. 25 is a schematic enlarged plan view of the region surrounded by the broken line in FIG. 24, viewed from the viewing surface side.
Figure 26:
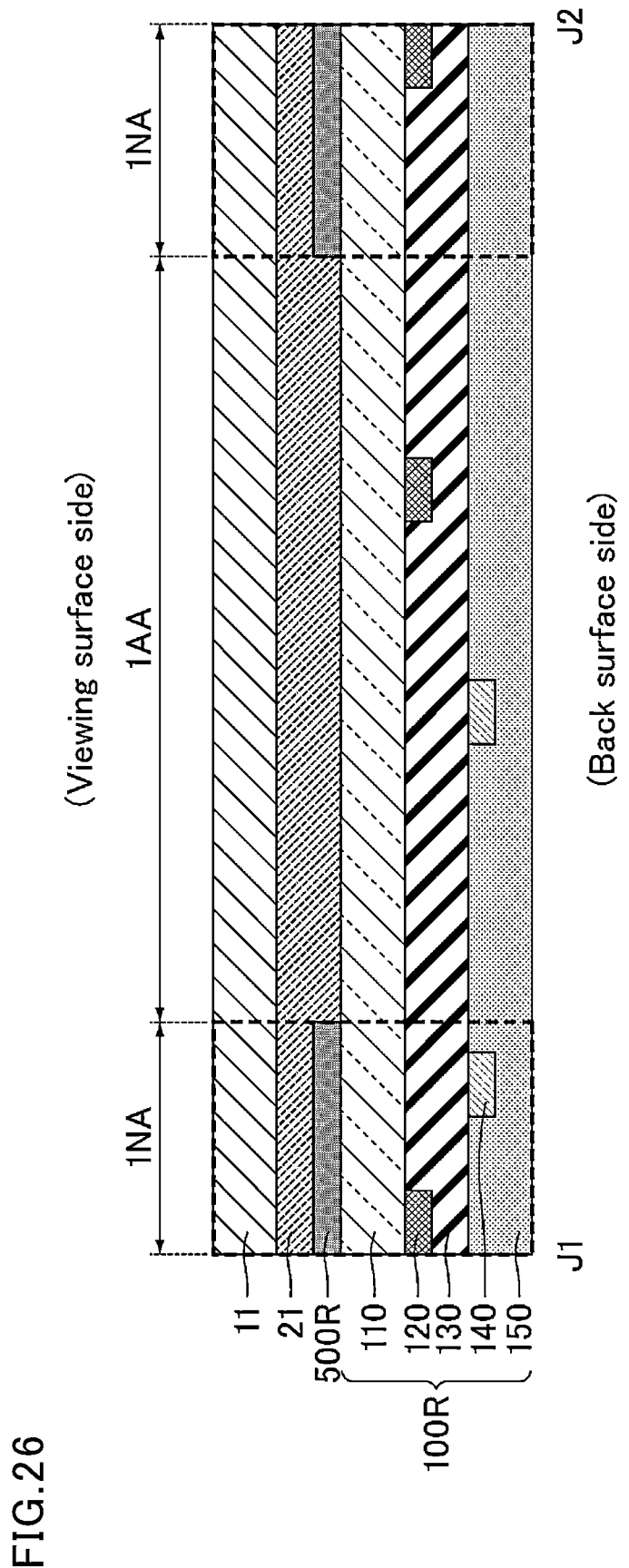
FIG. 26 is a schematic cross-sectional view taken along line J1-J2 in FIG. 25.

FIG. 24 is a schematic plan view of a liquid crystal display device of Comparative Example 2. FIG. 25 is a schematic enlarged plan view of the region surrounded by the broken line in FIG. 24, viewed from the viewing surface side. FIG. 26 is a schematic cross-sectional view taken along line J1-J2 in FIG. 25.

A liquid crystal display device 1R of Comparative Example 2 as shown in FIG. 24 to FIG. 26 was produced. The TFT substrate 100R of the liquid crystal display device 1R of Comparative Example 2 sequentially included from the viewing surface side toward the back surface side the support substrate 110, the gate line layer 120, the gate insulator 130, the source line layer 140, and the interlayer insulator 150. In Comparative Example 2, each of the gate line layer 120 and the source line layer 140 used had the same viewing surface side reflectance as that of Example 1-1-1.

The TFT substrate 100R and a CF substrate were produced each of which had a structure similar to that (of the corresponding substrate) in a typical liquid crystal display device, and were then attached together with a liquid crystal material in between, whereby a liquid crystal panel was produced which included the TFT substrate 100R, a liquid crystal layer, and the CF substrate. In the frame region 1NA, the print ink 500R was printed on the viewing surface side of the TFT substrate 100R of the liquid crystal panel. The first polarizing plate 11 was attached to the viewing surface side of the TFT substrate 100R via the first adhesive layer 21. In addition, a second polarizing plate was attached to the back surface side of the CF substrate via a second adhesive layer. Finally, a backlight was disposed on the back surface side of the second polarizing plate, whereby the liquid crystal display devices 1R of Comparative Example 2 was produced.

Comparative Example 3

Figure 27:
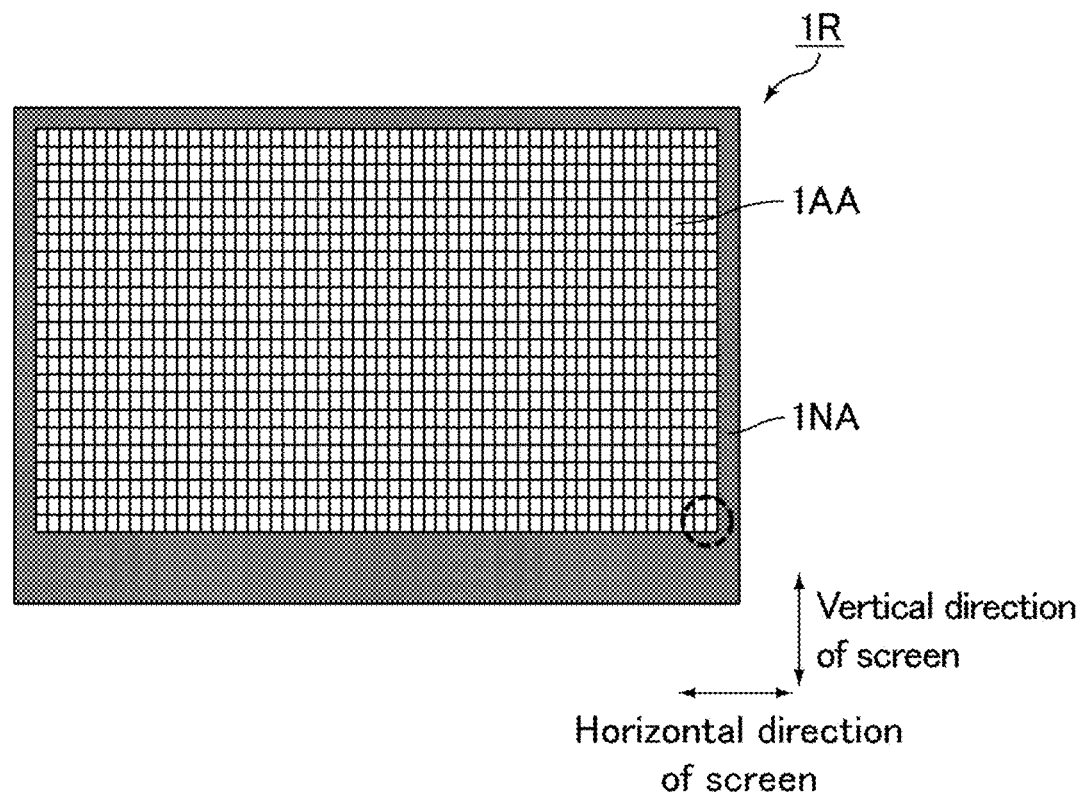
FIG. 27 is a schematic plan view of a liquid crystal display device of Comparative Example 3.
Figure 28:
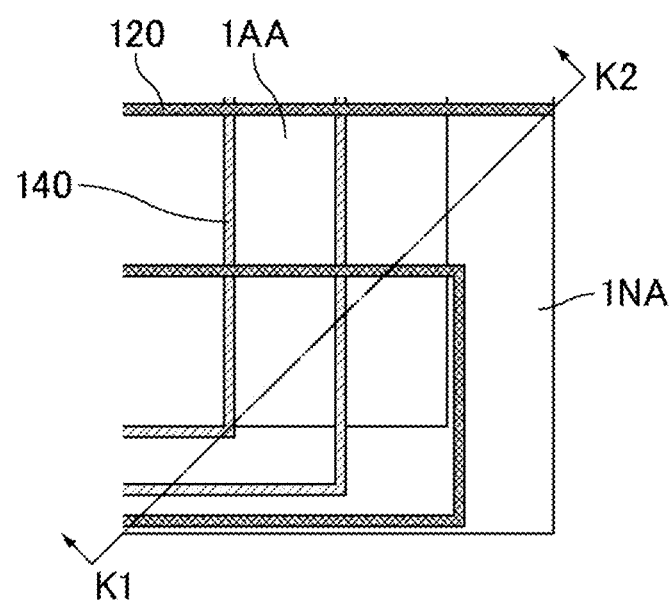
FIG. 28 is a schematic enlarged plan view of the region surrounded by the broken line in FIG. 27, viewed from the viewing surface side.
Figure 29:
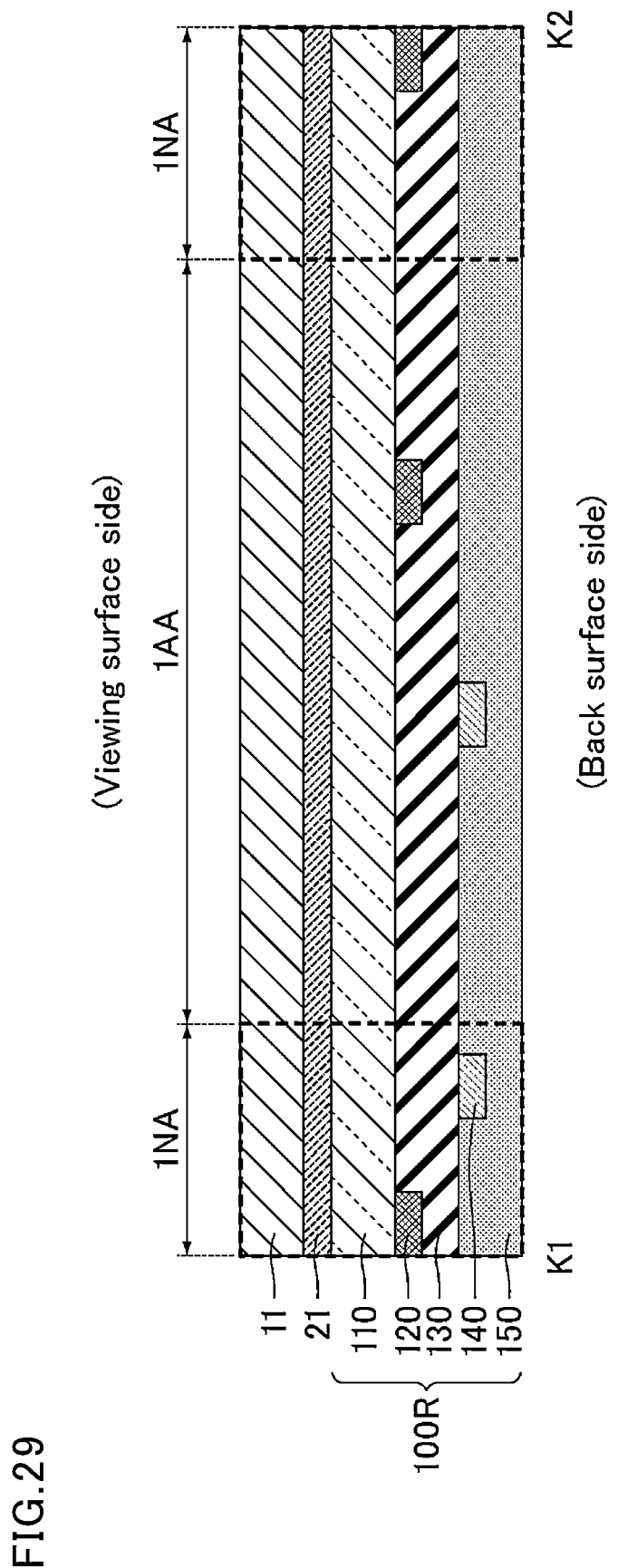
FIG. 29 is a schematic cross-sectional view taken along line K1-K2 in FIG. 28.

FIG. 27 is a schematic plan view of a liquid crystal display device of Comparative Example 3. FIG. 28 is a schematic enlarged plan view of the region surrounded by the broken line in FIG. 27, viewed from the viewing surface side. FIG. 29 is a schematic cross-sectional view taken along line K1-K2 in FIG. 28.

A liquid crystal display device 1R of Comparative Example 3 as shown in FIG. 27 to FIG. 29 was produced.

1-1-2, Examples 1-2-1 and 1-2-2, Examples 2-1-1 and 2-1-2, Example 2-2-1 and Example 2-2-2, Example 3-1-1 to Example 3-1-3, Example 3-2-1 to Example 3-2-3, Comparative Example 1-1 and Comparative Example 1-2, Comparative Example 2, and Comparative Example 3. Each reflectance in the frame region was measured in the state of a liquid crystal display device (module). That is, the reflectance was measured with the first polarizing plate 11 and the second polarizing plate 12 attached. For liquid crystal display devices with a print ink, the reflectance was measured with the print ink printed. For liquid crystal display devices with cover glass, the reflectance was measured with cover glass mounted.

TABLE 1

| | Cover glass | Reflectance in frame region | Unevenness between frame region and active area | Margin between frame region and active area |
|---|---|---|---|---|
| Comparative Example 1-1 | Present | 5% | Absent | Present |
| Comparative Example 1-2 | Present | 5% | Absent (* bubbles generated) | Present |
| Comparative Example 2 | Absent | 5% | Present | Present |
| Comparative Example 3 | Absent | 15% | Absent | Absent |
| Example 1-1-1 | Absent | 5% | Absent | Absent |
| Example 1-1-2 | Absent | 8% | Absent | Absent |
| Example 1-2-1 | Absent | 5% | Absent | Absent |
| Example 1-2-2 | Absent | 8% | Absent | Absent |
| Example 2-1-1 | Absent | 6% | Absent | Absent |
| Example 2-1-2 | Absent | 9% | Absent | Absent |
| Example 2-2-1 | Absent | 6% | Absent | Absent |
| Example 2-2-2 | Absent | 9% | Absent | Absent |
| Example 3-1-1 | Absent | 5% | Absent | Absent |
| Example 3-1-2 | Absent | 5% | Absent | Absent |
| Example 3-1-3 | Absent | 5% | Absent | Absent |
| Example 3-2-1 | Absent | 5% | Absent | Absent |
| Example 3-2-2 | Absent | 5% | Absent | Absent |
| Example 3-2-3 | Absent | 5% | Absent | Absent |

The TFT substrate 100R of the liquid crystal display device 1R of Comparative Example 3 sequentially included from the viewing surface side toward the back surface side the support substrate 110, the gate line layer 120, the gate insulator 130, the source line layer 140, and the interlayer insulator 150. In Comparative Example 3, each of the gate line layer 120 and the source line layer 140 used had the same viewing surface side reflectance as that of Example 1-1-1.

The TFT substrate 100R and a CF substrate were produced each of which had a structure similar to that (of the corresponding substrate) in a typical liquid crystal display device, and were then attached together with a liquid crystal material in between, whereby a liquid crystal panel was produced which included the TFT substrate 100R, a liquid crystal layer, and the CF substrate. To the liquid crystal panel, the first polarizing plate 11 was attached on the viewing surface side of the TFT substrate 100R via the first adhesive layer 21, and a second polarizing plate was attached on the back surface side of the CF substrate via a second adhesive layer. Finally, a backlight was disposed on the back surface side of the second polarizing plate, whereby the liquid crystal display device 1R of Comparative Example 3 was produced.

Evaluation of Examples and Comparative Examples

The reflectance in the frame region was measured with CM-2600d available from Konica Minolta, Inc. in each of the liquid crystal display devices of Examples 1-1-1 and As shown in Table 1, the liquid crystal display device 1R of Comparative Example 3, not having the print ink 500R in the frame region 1NA, had a high reflectance in the frame region 1NA.

Meanwhile, the examples, including the reflectance-reducing layer 500 in the frame region 1NA, succeeded in reducing the reflectance.

Figure 30:
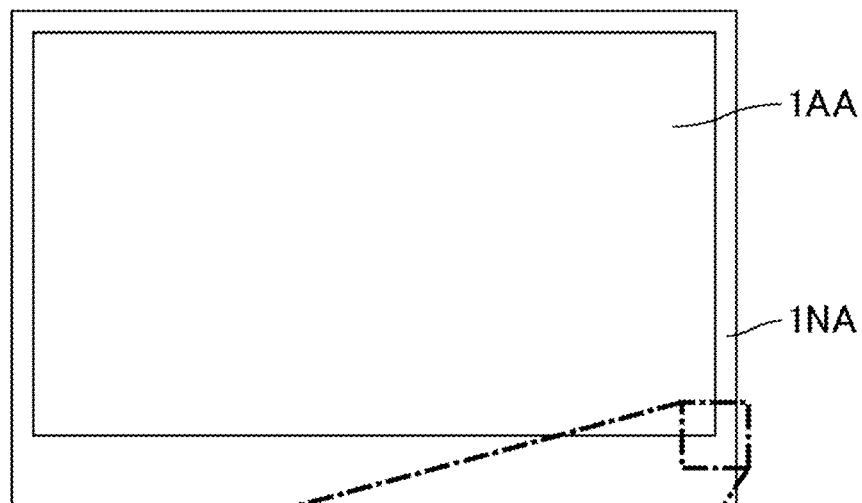
FIG. 30 is a schematic plan view for describing a print margin area provided for printing an ink in the frame region.

FIG. 30 is a schematic plan view for describing a print margin area provided for printing an ink in the frame region. Comparative Example 1-1 and Comparative Example 1-2 and Comparative Example 2, each having the print ink 500R in the frame region 1NA, succeeded in reducing the reflectance in the frame region 1NA. Unfortunately, in order to print the print ink 500R, a print margin area 1PA had to be provided between the display region 1AA and the frame region 1NA as shown in FIG. 30. This structure had difficulty in achieving a narrow frame.

Meanwhile, the examples, having no need for having the print ink 500R and thus having no need for providing the print margin area 1PA, achieved a narrow frame.

Figure 31:
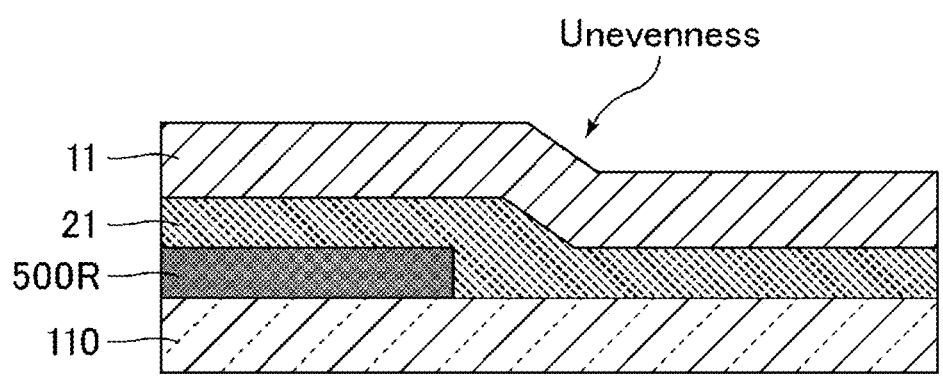
FIG. 31 is a schematic cross-sectional view for describing unevenness caused by printing an ink.

FIG. 31 is a schematic cross-sectional view for describing unevenness caused by printing an ink. In the liquid crystal display device 1R of Comparative Example 2, the print ink 500R was printed between the polarizing plate 11 and the TFT substrate 100R via the first adhesive layer 21, and the cover glass 600 was not provided. Accordingly, the unevenness caused by the print ink 500R deteriorated the appearance of the frame portion 1NA as shown in FIG. 31.

Meanwhile, the examples, including the in-cell reflectance-reducing layer 500 for reducing reflection of external light, succeeded in reducing unevenness caused in Comparative Example 2 or the like, to reduce deterioration of the appearance of the frame region 1NA caused by such unevenness.

Figure 32:
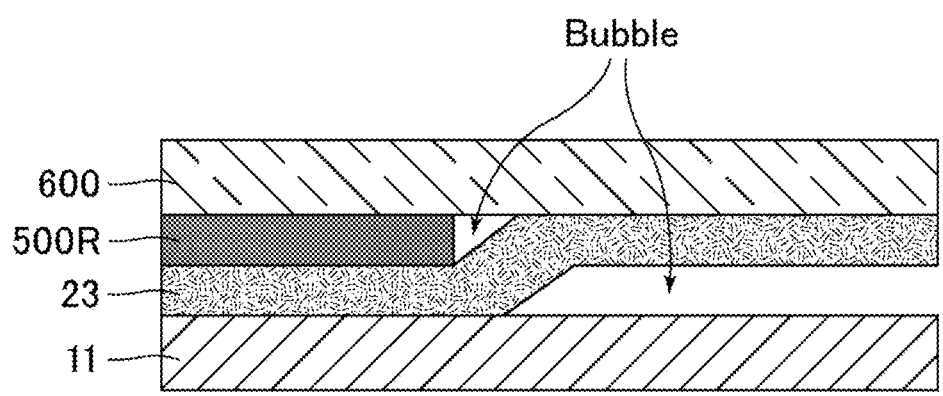
FIG. 32 is a schematic cross-sectional view of the liquid crystal display device of Comparative Example 1-2.
Figure 33:
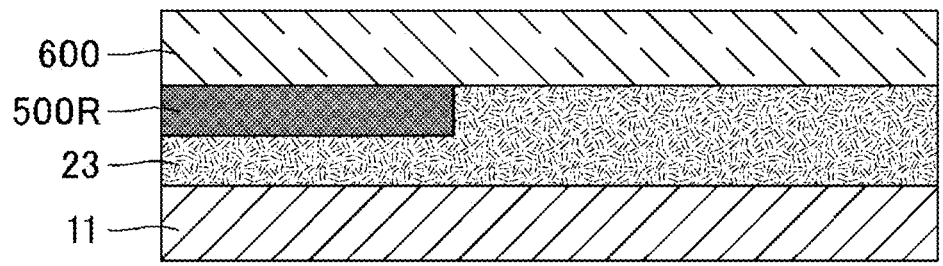
FIG. 33 is a schematic cross-sectional view of the liquid crystal display device of Comparative Example 1-1.

FIG. 32 is a schematic cross-sectional view of the liquid crystal display device of Comparative Example 1-2. FIG. 33 is a schematic cross-sectional view of the liquid crystal display device of Comparative Example 1-1. The liquid crystal display device 1R of each of Comparative Example 1-1 and Comparative Example 1-2 included the cover glass 600 and thus caused no unevenness between the frame region 1NA and the display region 1AA.

However, Comparative Example 1-2, having the third adhesive layer 23 with a thickness of 25 μm used for attaching the first polarizing plate 11, failed to absorb the thickness of the print ink 500R printed on the cover glass 600 to cause bubbles as shown in FIG. 32.

Meanwhile, Comparative Example 1-1, having the third adhesive layer 23 with a thickness of 100 μm, succeeded in absorbing the thickness of the print ink 500R as shown in FIG. 33 to prevent bubbles. However, this structure raised the cost as compared to Comparative Example 1-2 whose third adhesive layer 23 had a thickness of 25 μm.

Each of Comparative Example 1-1 and Comparative Example 1-2 including the cover glass 600 failed to reduce the number of components. In addition, Comparative Example 1-1, using a thicker third adhesive layer 23, further raised the cost.

Meanwhile, the examples, not including the cover glass 600, succeeded in reducing the number of components.

REFERENCE SIGNS LIST 1, 1R: liquid crystal display device
1AA: display region (active area)
1AAS, 1NAX: region
1NA: frame region
1NA1: substantially frame-shaped region
1NA2: terminal side
1NA22: end (substrate end)
1PA: print margin area
11: first polarizing plate
12: second polarizing plate
21: first adhesive layer
22: second adhesive layer
23: third adhesive layer
100, 100R: thin-film transistor (TFT) substrate
100TP: touch panel-driving line
100X: substrate end
101: gate line
102: source line
103: thin-film transistor (TFT)
104: pixel electrode
110: support substrate
111: metal film
112: insulating layer
113: overcoat layer
120: gate line layer
121: float electrode
130: gate insulator
140: source line layer
150: interlayer insulator
200: color filter (CF) substrate
300: liquid crystal layer
400: sealing material
500: reflectance-reducing layer
500R: print ink
600: cover glass
5111, 5121: multilayer film

What is claimed is:

1. A liquid crystal display device comprising:
a display region for displaying an image; and
a frame region surrounding the display region,
the liquid crystal display device sequentially comprising from a viewing surface side toward a back surface side: a first polarizing plate; a first substrate provided with a switching element connected to a gate line and a source line; a liquid crystal layer; a second substrate; and a second polarizing plate,
in the frame region, the first substrate sequentially comprising from a viewing surface side toward a back surface side a glass substrate, a reflectance-reducing layer, and a metal line layer that overlaps the reflectance-reducing layer and includes at least one of a gate line layer provided with the gate line or a source line layer provided with the source line,
the reflectance-reducing layer having a lower viewing surface side reflectance than the metal line layer.

2. The liquid crystal display device according to claim 1, wherein the metal line layer includes the gate line layer or the source line layer whichever is closer to the viewing surface.

3. The liquid crystal display device according to claim 1, wherein the first substrate includes a terminal side for disposing a terminal, and
the first polarizing plate extends to an end of the terminal side.

4. The liquid crystal display device according to claim 1, wherein the reflectance-reducing layer includes at least one of an organic film or an inorganic film.

5. The liquid crystal display device according to claim 4, wherein the organic film is a retardation film.

6. The liquid crystal display device according to claim 5, wherein the retardation film has a slow axis forming an angle of 45° with a transmission axis of the first polarizing plate.

7. The liquid crystal display device according to claim 4, wherein the organic film is a polarizing film.

8. The liquid crystal display device according to claim 7, wherein the polarizing film has a transmission axis forming an angle of 90° with a transmission axis of the first polarizing plate.

9. The liquid crystal display device according to claim 4, wherein the inorganic film is in contact with the metal line layer.

10. The liquid crystal display device according to claim 1, wherein the first substrate includes a touch panel-driving line on a back surface side of the glass substrate.

11. The liquid crystal display device according to claim 1, wherein in the frame region, the first substrate further includes a metal film that overlaps the reflectance-reducing layer and is in contact with a back surface side of the reflectance-reducing layer.

12. The liquid crystal display device according to claim 1, wherein in the frame region, the first substrate further includes an insulating layer between the reflectance-reducing layer and the metal line layer.

13. The liquid crystal display device according to claim 1, wherein the reflectance-reducing layer is in contact with the gate line layer.

14. The liquid crystal display device according to claim 1, wherein the reflectance-reducing layer is covered with an insulating film.

15. The liquid crystal display device according to claim 14,
wherein the insulating film is a gate insulator.

16. A liquid crystal display device comprising:
a display region for displaying an image; and
a frame region surrounding the display region,
the liquid crystal display device sequentially comprising from a viewing surface side toward a back surface side: a first polarizing plate; a first substrate provided with a switching element connected to a gate line and a source line; a liquid crystal layer; a second substrate; and a second polarizing plate,
in the frame region, the first substrate sequentially comprising from a viewing surface side toward a back surface side a support substrate, a reflectance-reducing layer, and a metal line layer that overlaps the reflectance-reducing layer and includes at least one of a gate line layer provided with the gate line or a source line layer provided with the source line,
the reflectance-reducing layer having a lower viewing surface side reflectance than the metal line layer,
wherein in the frame region, the first substrate further includes a float electrode that overlaps the reflectance-reducing layer and is in contact with a back surface side of the reflectance-reducing layer,
in the frame region, the reflectance-reducing layer and the float electrode overlap the source line layer, and
the float electrode is a conductive layer that is disposed in the same layer as for the gate line layer and is not connected to the gate line layer.

17. The liquid crystal display device according to claim 16,
wherein the metal line layer includes the gate line layer or the source line layer whichever is closer to the viewing surface.

18. The liquid crystal display device according to claim 16,
wherein the first substrate includes a terminal side for disposing a terminal, and the first polarizing plate extends to an end of the terminal side.

19. The liquid crystal display device according to claim 16,
wherein the reflectance-reducing layer includes at least one of an organic film or an inorganic film.

20. The liquid crystal display device according to claim 19,
wherein the organic film is a retardation film.

21. The liquid crystal display device according to claim 20,
wherein the retardation film has a slow axis forming an angle of 45° with a transmission axis of the first polarizing plate.

22. The liquid crystal display device according to claim 19,
wherein the organic film is a polarizing film.

23. The liquid crystal display device according to claim 22,
wherein the polarizing film has a transmission axis forming an angle of 90° with a transmission axis of the first polarizing plate.

24. The liquid crystal display device according to claim 19,
wherein the inorganic film is in contact with the metal line layer.

25. The liquid crystal display device according to claim 16,
wherein the first substrate includes a touch panel-driving line on a back surface side of the support substrate.

26. The liquid crystal display device according to claim 16,
wherein in the frame region, the first substrate further includes a metal film that overlaps the reflectance-reducing layer and is in contact with a back surface side of the reflectance-reducing layer.

27. The liquid crystal display device according to claim 16,
wherein in the frame region, the first substrate further includes an insulating layer between the reflectance-reducing layer and the metal line layer.

* * * * *